United States Patent
Fukuda

(10) Patent No.: US 12,518,928 B2
(45) Date of Patent: Jan. 6, 2026

(54) MULTILAYER CERAMIC ELECTRONIC COMPONENT

(71) Applicant: Murata Manufacturing Co., Ltd., Nagaokakyo (JP)

(72) Inventor: Yoshihiro Fukuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 497 days.

(21) Appl. No.: 18/138,206

(22) Filed: Apr. 24, 2023

(65) Prior Publication Data

US 2023/0368976 A1    Nov. 16, 2023

(30) Foreign Application Priority Data

May 12, 2022    (JP) .................. 2022-078783

(51) Int. Cl.
*H01G 4/30* (2006.01)
*H01G 4/232* (2006.01)

(52) U.S. Cl.
CPC .............. *H01G 4/2325* (2013.01); *H01G 4/30* (2013.01)

(58) Field of Classification Search
CPC ........ H01G 4/30; H01G 4/232; H01G 4/2325; H01G 4/248; H01G 4/228
USPC ...................... 361/301.4, 306.3, 321.1, 321.3
See application file for complete search history.

(56) References Cited

U.S. PATENT DOCUMENTS

| | | | | |
|---|---|---|---|---|
| 8,320,101 | B2* | 11/2012 | Takeuchi | H01G 4/2325 29/25.42 |
| 2004/0257748 | A1* | 12/2004 | Ritter | H01G 4/012 361/306.3 |
| 2009/0290280 | A1 | 11/2009 | Takeuchi et al. | |
| 2011/0234045 | A1* | 9/2011 | Motoki | H01G 4/005 156/89.18 |
| 2011/0236658 | A1* | 9/2011 | Motoki | H01G 4/2325 428/213 |
| 2011/0290542 | A1* | 12/2011 | Nishisaka | H05K 1/182 174/257 |
| 2020/0312565 | A1* | 10/2020 | Kanzaki | H01G 4/2325 |

FOREIGN PATENT DOCUMENTS

JP    2009-283597 A    12/2009

* cited by examiner

*Primary Examiner* — Arun Ramaswamy
(74) *Attorney, Agent, or Firm* — Keating & Bennett, LLP

(57) ABSTRACT

A multilayer ceramic electronic component includes a multilayer body including first and second internal electrode layers extending first and second end surfaces, first and second external electrodes respectively on the first and second end surfaces and respectively connected to the first and second internal electrode layers. The first external electrode includes first and third Cu plating layers, the second external electrode includes second and fourth Cu plating layers. Average numbers of Cu particles are about 1.5 or less in two or more first or second square regions of the first and second Cu plating layers. Average numbers of Cu particles are more than about 1.5 in two or more third or fourth square regions of the third and fourth Cu plating layer. The first square regions to the fourth square regions each has a square or substantially square shape with each side having a dimension of about 2 μm.

19 Claims, 12 Drawing Sheets

II-II CROSS-SECTIONAL VIEW

III-III CROSS-SECTIONAL VIEW

IV-IV CROSS-SECTIONAL VIEW

V-V CROSS-SECTIONAL VIEW

VI-VI CROSS-SECTIONAL VIEW

XI–XI CROSS-SECTIONAL VIEW

XII–XII CROSS-SECTIONAL VIEW

XIII-XIII CROSS-SECTIONAL VIEW

XIV-XIV CROSS-SECTIONAL VIEW

MULTILAYER CERAMIC ELECTRONIC COMPONENT

CROSS REFERENCE TO RELATED APPLICATIONS

This application claims the benefit of priority to Japanese Patent Application No. 2022-078783 filed on May 12, 2022. The entire contents of this application are hereby incorporated herein by reference.

BACKGROUND OF THE INVENTION

1. Field of the Invention

The present invention relates to a multilayer ceramic electronic component.

2. Description of the Related Art

Recent improvements in performance of electronic devices such as mobile phones, notebook computers, and digital cameras demand reduction in size of a multilayer ceramic electronic component used in such electronic devices. In general, a multilayer ceramic electronic component includes a multilayer body and an external electrode. The multilayer body includes an inner layer portion and an outer layer portion. The inner layer portion is formed by alternately stacking a plurality of ceramic layers and a plurality of internal electrode layers in a prescribed stacking direction. The outer layer portion is formed by disposing a ceramic layer on the surface of the inner layer portion with the inner layer portion interposed therebetween in the stacking direction. The plurality of internal electrode layers are exposed at both end surfaces of the multilayer body in the width direction orthogonal to the stacking direction. In a multilayer ceramic electronic component disclosed in Japanese Patent Laid-Open No. 2009-283597, an external electrode is formed by plating directly on an end surface of a multilayer body so as to be electrically connected to an internal electrode layer exposed from the end surface. By forming the external electrode by plating directly on the end surface of the multilayer body, the external electrode can be planarized and reduced in thickness. Thus, the multilayer ceramic electronic component can be reduced in size, so that the degree of freedom of mounting on the substrate can be improved, and electronic devices can also be reduced in size.

However, in the case where the external electrode is formed by plating directly on the end surface of the multilayer body as in Japanese Patent Laid-Open No. 2009-283597, the adhesive strength between the multilayer body and a plating layer that serves as the external electrode is weakened. This causes peeling-off of the plating layer from the multilayer body, with the result that the reliability of the multilayer ceramic electronic component decreases.

Thus, a heat treatment is performed after the external electrode is formed by plating directly on the multilayer body. This causes mutual diffusion between the metal of the internal electrode layer and the metal of the plating layer to thus improve the adhesive strength between the internal electrode layer and the plating layer, and also improve the adhesive strength between the multilayer body and the external electrode. However, the heat treatment causes growth of grains in the metal component in the plating layer, with the result that the mechanical strength of the plating layer decreases.

SUMMARY OF THE INVENTION

Preferred embodiments of the present invention provide multilayer ceramic electronic components in each of which an adhesive strength between an external electrode and a multilayer body is improved even when the external electrode is plated directly on the multilayer body.

A multilayer ceramic electronic component according to a preferred embodiment of the present invention includes a multilayer body including a plurality of ceramic layers that are stacked, the multilayer body including a first main surface and a second main surface that are opposite to each other in a height direction, a first end surface and a second end surface that are opposite to each other in a length direction orthogonal or substantially orthogonal to the height direction, and a first side surface and a second side surface that are opposite to each other in a width direction orthogonal or substantially orthogonal to the height direction and the length direction, a plurality of first internal electrode layers provided on the ceramic layers and extending to the first end surface, a plurality of second internal electrode layers provided on the ceramic layers and extending to the second end surface, a first external electrode provided on the first end surface and connected to the first internal electrode layers, and a second external electrode provided on the second end surface and connected to the second internal electrode layers. The first external electrode includes a first Cu plating layer and a third Cu plating layer on the first Cu plating layer. The second external electrode includes a second Cu plating layer and a fourth Cu plating layer on the second Cu plating layer. An average number of Cu particles is about 1.5 or less in any two or more first square regions of the first Cu plating layer on a side of the first end surface, and an average number of Cu particles is about 1.5 or less in any two or more second square regions of the second Cu plating layer on a side of the second end surface. An average number of Cu particles is more than about 1.5 in any two or more third square regions of the third Cu plating layer on a side of the first end surface, and an average number of Cu particles is more than about 1.5 in any two or more fourth square regions of the fourth Cu plating layer on a side of the second end surface. Each of the first square regions to the fourth square regions has a square or substantially square shape with each side having a length of about 2 μm.

In a multilayer ceramic electronic component according to a preferred embodiment of the present invention described above, the average number of Cu particles is about 1.5 or less in the first square regions of the first Cu plating layer and is about 1.5 or less in the second square regions of the second Cu plating layer, so that the adhesive strength between the first Cu plating layer and the first internal electrode layers is improved, the adhesive strength between the second Cu plating layer and the second internal electrode layers is improved, and the equivalent series resistance (ESR) in the region including each of the adhesion portions is reduced. As a result, the adhesive strength between the first external electrode including the first Cu plating layer and the first internal electrode layers is able to be improved, and the adhesive strength between the second external electrode including the second Cu plating layer and the second internal electrode layers is able to be improved, and further, the ESR is able to be lowered.

Further, since the number of Cu particles is more than about 1.5 in the third square regions of the third Cu plating layer and is more than about 1.5 in the fourth square regions of the fourth Cu plating layer, the mechanical strength of each of the third Cu plating layer and the fourth Cu plating layer is improved. Therefore, the mechanical strength of the first external electrode including the third Cu plating layer is improved while the mechanical strength of the second external electrode including the fourth Cu plating layer is improved.

According to preferred embodiments of the present invention, in multilayer ceramic electronic components in each of which the external electrode is plated directly on the multilayer body, the adhesive strength between the external electrode and the multilayer body is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

1. Two-Terminal Multilayer Ceramic Capacitor

The following describes a two-terminal multilayer ceramic capacitor as an example of a multilayer ceramic electronic component according to the first preferred embodiment of the present invention.

Figure 1:
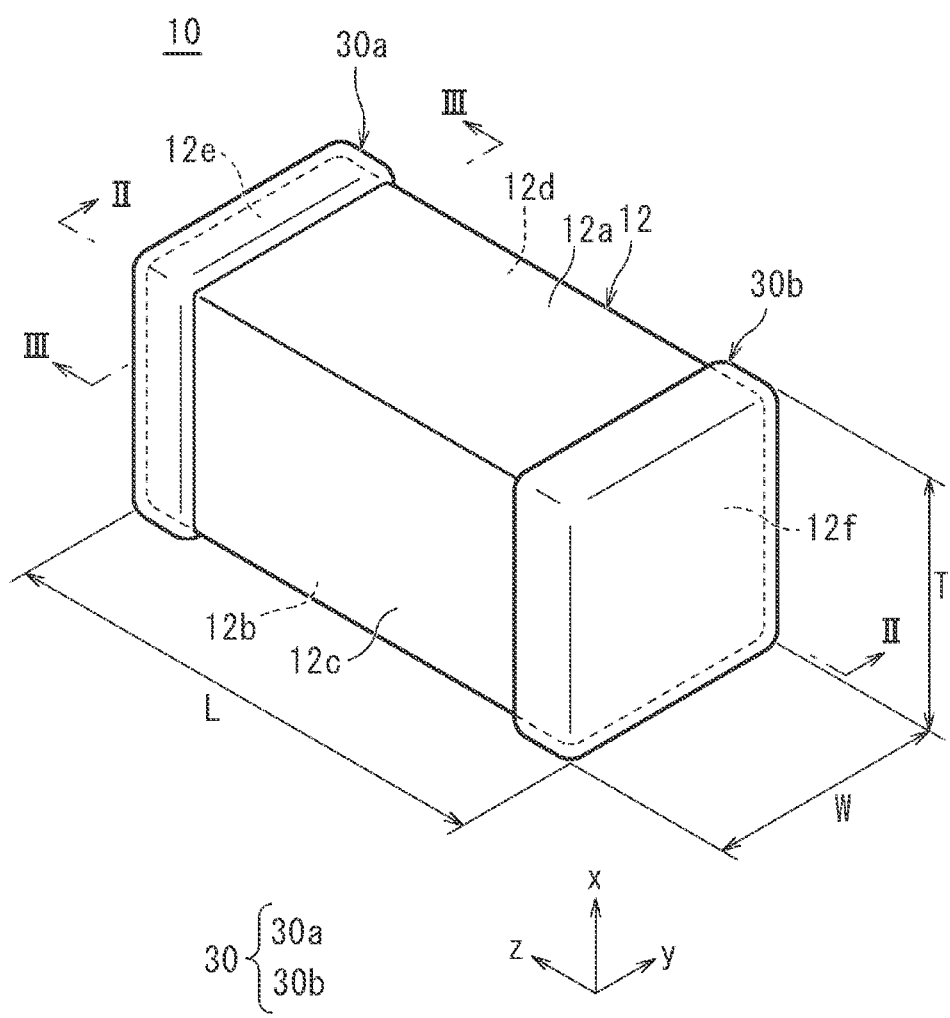
FIG. 1 is an external perspective view showing one example of a two-terminal multilayer ceramic capacitor as a multilayer ceramic electronic component according to a first preferred embodiment of the present invention.
Figure 2:
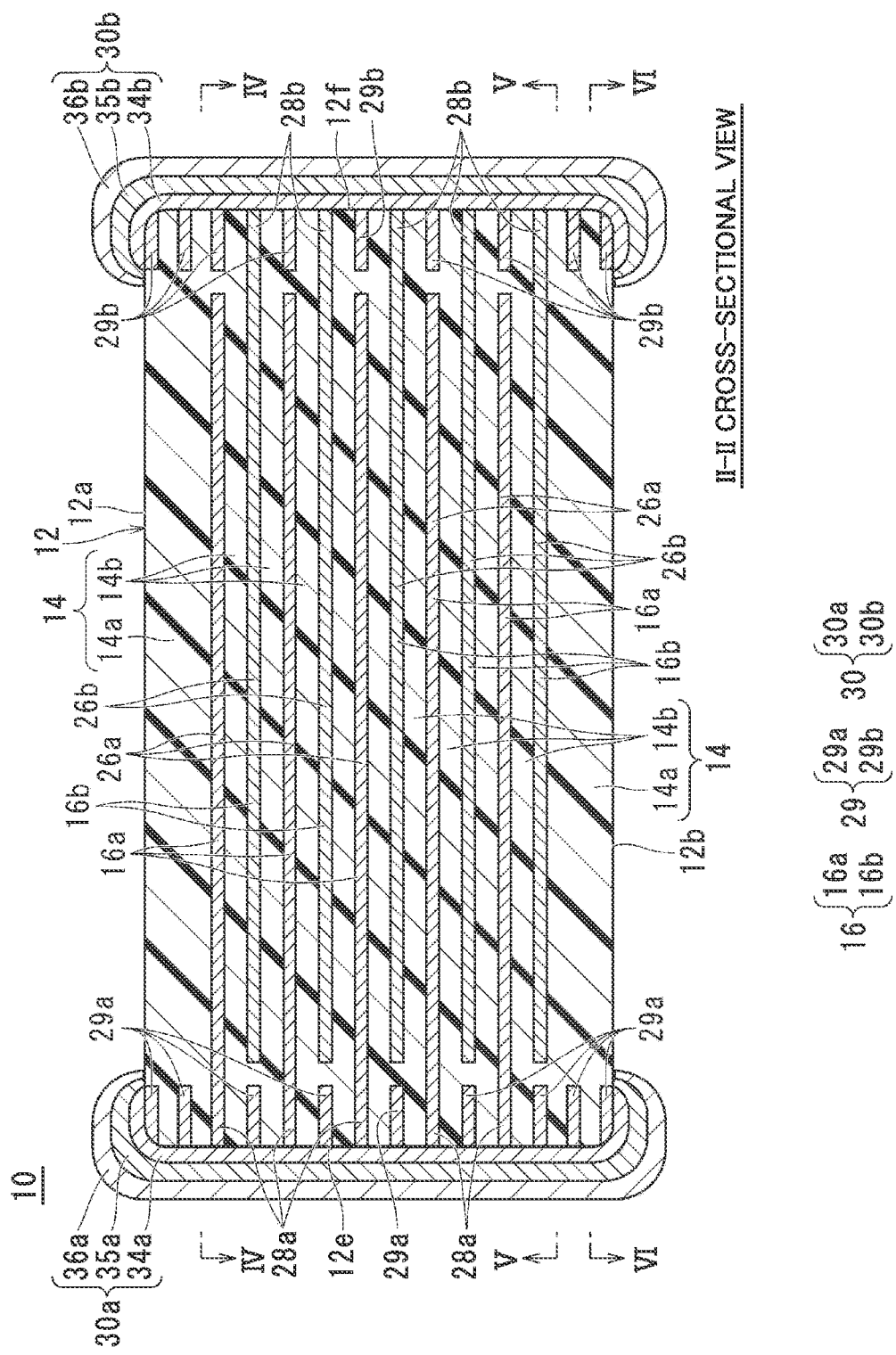
FIG. 2 is a cross-sectional view taken along a line II-II in FIG. 1.
Figure 3:
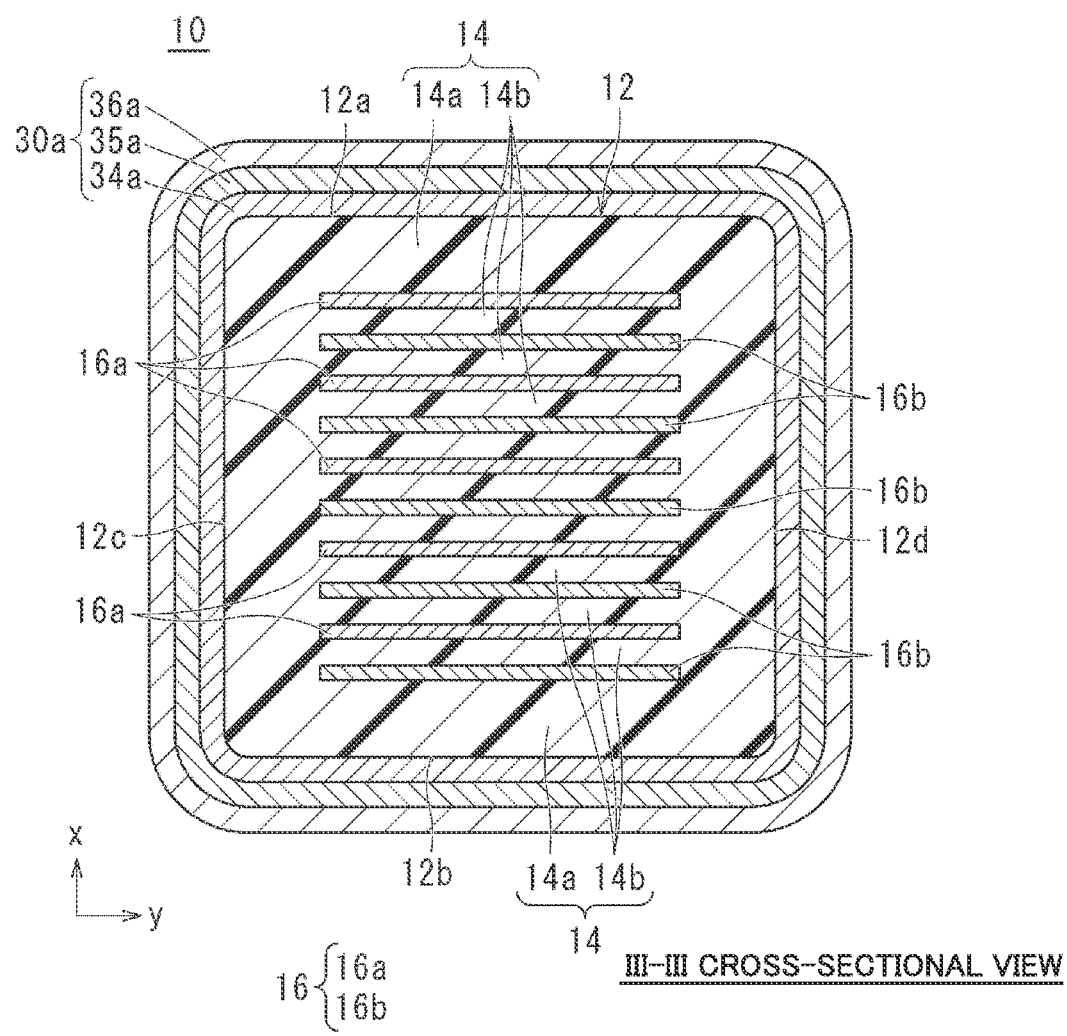
FIG. 3 is a cross-sectional view taken along a line III-III in FIG. 1.
Figure 4:
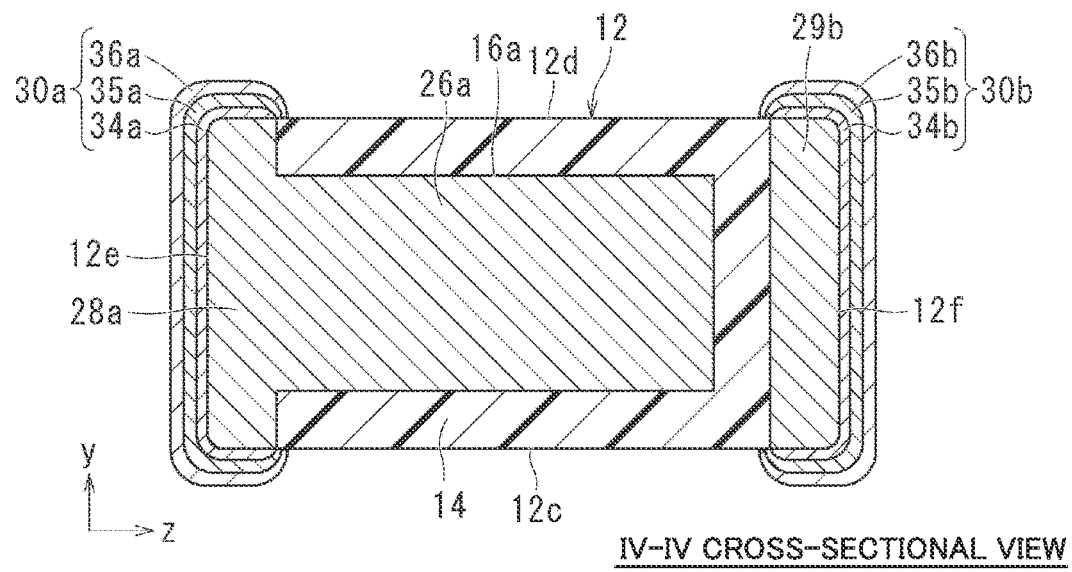
FIG. 4 is a cross-sectional view taken along a line IV-IV in FIG. 2.
Figure 5:
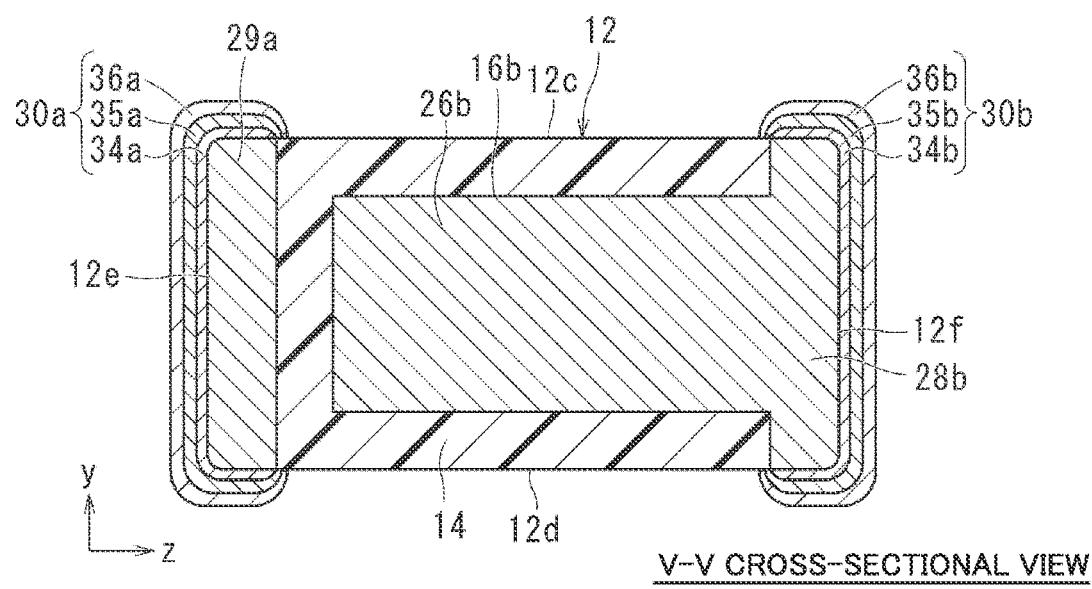
FIG. 5 is a cross-sectional view taken along a line V-V in FIG. 2.
Figure 6:
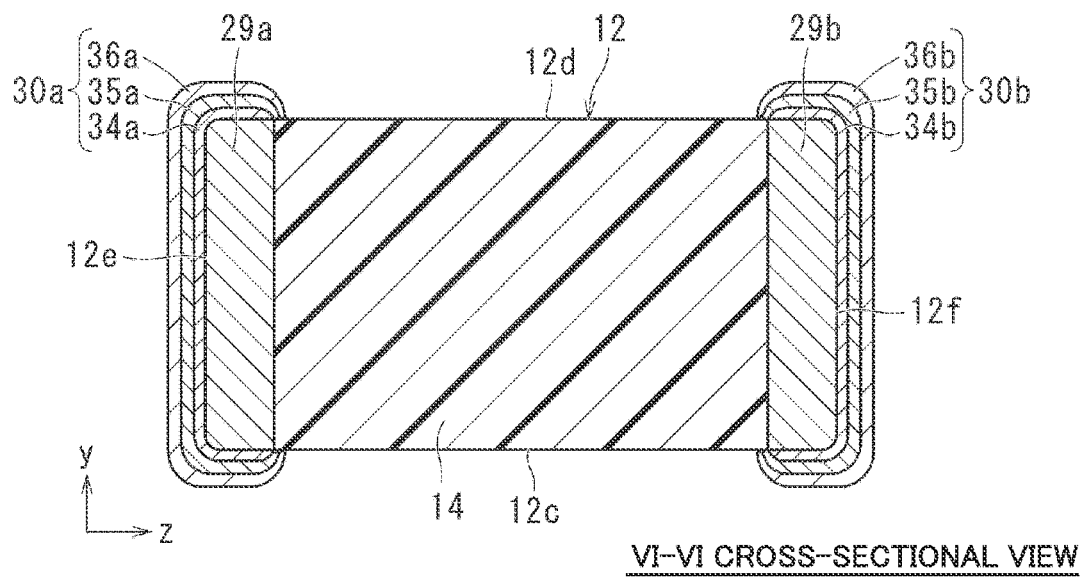
FIG. 6 is a cross-sectional view taken along a line VI-VI in FIG. 2.
Figure 7:
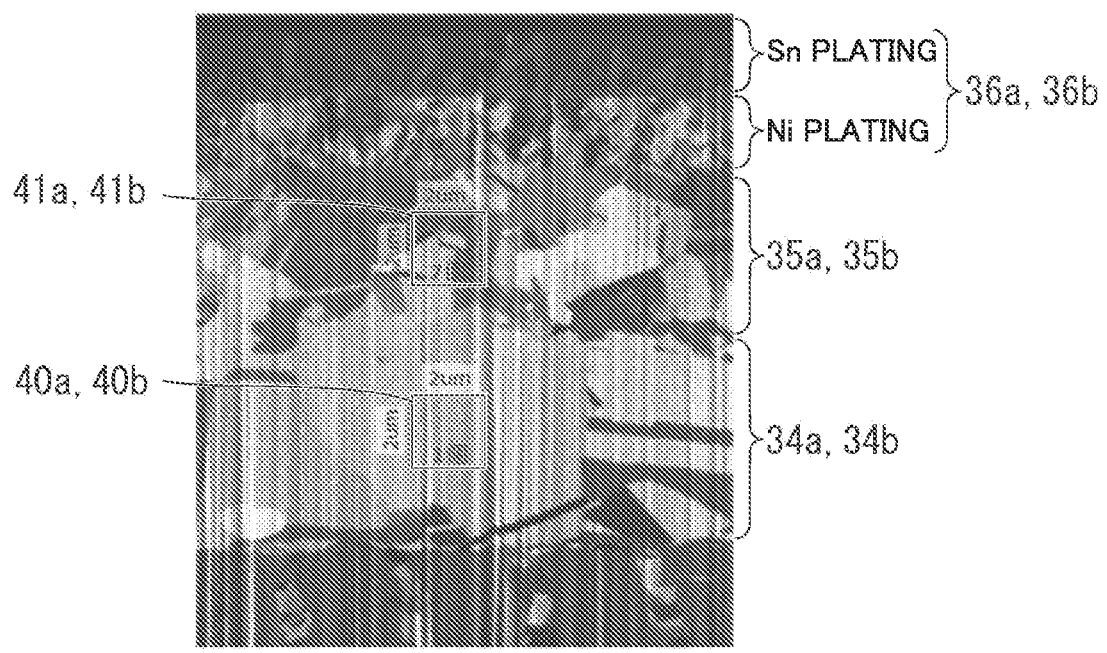
FIG. 7 is a cross-sectional view showing a first square region and a second square region.

FIG. 1 is an external perspective view showing one example of a two-terminal multilayer ceramic capacitor as a multilayer ceramic electronic component according to the first preferred embodiment of the present invention. FIG. 2 is a cross-sectional view taken along a line II-II in FIG. 1. FIG. 3 is a cross-sectional view taken along a line in FIG. 1. FIG. 4 is a cross-sectional view taken along a line IV-IV in FIG. 2. FIG. 5 is a cross-sectional view taken along a line V-V in FIG. 2. FIG. 6 is a cross-sectional view taken along a line VI-VI in FIG. 2. FIG. 7 is a cross-sectional view showing a first square region and a second square region.

As shown in FIGS. 1 to 3, a two-terminal multilayer ceramic capacitor 10 includes a multilayer body 12 having a rectangular or substantially rectangular parallelepiped shape and an external electrode 30 disposed at each of both ends of multilayer body 12.

(1) Multilayer Body

Multilayer body 12 includes a first main surface 12a and a second main surface 12b that are opposite to each other in a height direction x (a stacking direction), a first side surface 12c and a second side surface 12d that are opposite to each other in a width direction y orthogonal or substantially orthogonal to height direction x, and a first end surface 12e and a second end surface 12f that are opposite to each other in a length direction z orthogonal or substantially orthogonal to height direction x and width direction y. Multilayer body 12 of the present preferred embodiment includes corners and ridges, each of which is rounded. A corner corresponds to a portion at which adjoining three planes of multilayer body 12 meet, and a ridge corresponds to a portion at which adjoining two planes of multilayer body 12 meet. Further, protrusions and recesses or the like may be provided partially or entirely in first main surface 12a and second main surface 12b, first side surface 12c and second side surface 12d, and first end surface 12e and second end surface 12f.

Multilayer body 12 includes an outer layer portion 14a including a plurality of ceramic layers 14 and a plurality of auxiliary electrode layers 29 respectively disposed on ceramic layers 14, and an inner layer portion 14b including one or a plurality of ceramic layers 14 and a plurality of internal electrode layers 16 and a plurality of auxiliary electrode layers 29 that are disposed on ceramic layers 14. Outer layer portion 14a includes a first outer layer portion located on the first main surface 12a side of multilayer body 12 and a second outer layer portion located on the second main surface 12b side of multilayer body 12. The first outer layer portion includes a plurality of ceramic layers 14 located between first main surface 12a and an internal electrode layer 16 closest to first main surface 12a, and the plurality of auxiliary electrode layers 29 respectively disposed on ceramic layers 14. The second outer layer portion includes a plurality of ceramic layers 14 located between second main surface 12b and an internal electrode layer 16 closest to second main surface 12b, and a plurality of auxiliary electrode layers 29 respectively disposed on ceramic layers 14. The region sandwiched between both outer layer portions 14a is inner layer portion 14b. In inner layer portion 14b, ceramic layers 14 are stacked while alternating with internal electrode layers 16 and auxiliary electrode layers 29 in height direction x.

A facing portion indicates a portion of multilayer body 12 in which a first internal electrode layer 16a (described later) and a second internal electrode layer 16b (described later) face each other. Also, a W gap or a side gap indicates a portion between the facing portion and first side surface 12c, and a portion between the facing portion and second side surface 12d. Further, an L gap or an end gap indicates a portion between the facing portion and first end surface 12e, and a portion between the facing portion and second end surface 12f, and more specifically, a portion including an extending electrode portion in one of first internal electrode layer 16a and second internal electrode layer 16b.

The dimensions of multilayer body 12 are not particularly limited, but are preferably set, for example, such that a dimension L in length direction z is about 0.18 mm or more and about 9.95 mm or less, a dimension W in width direction y is about 0.08 mm or more and about 9.95 mm or less, and a dimension T in height direction x is about 0.08 mm or more and about 4.95 or less.

Examples of a dielectric material used for ceramic layer 14 can be a dielectric ceramic including a component such as $BaTiO_3$, $CaTiO_3$, $SrTiO_3$, or $CaZrO_3$. In the case where the ceramic material is included as a main component, for example, a material such as an Mn compound, an Fe compound, a Cr compound, a Co compound, or an Ni compound that is obtained by adding a subcomponent smaller in content than the main component may be used depending on the desired characteristics of multilayer body 12.

When a piezoelectric ceramic material is used for ceramic layer 14, the multilayer ceramic electronic component defines and functions as a piezoelectric component. Specific examples of the piezoelectric ceramic material include lead zirconate titanate (PZT)-based ceramic material, and the like.

When a semiconductor ceramic material is used for ceramic layer 14, the multilayer ceramic electronic component defines and functions as a thermistor. Specific examples of the semiconductor ceramic material include a spinel-based ceramic material, and the like.

Further, when a magnetic ceramic material is used for ceramic layer 14, the multilayer ceramic electronic component defines and functions as an inductor. When the multilayer ceramic electronic component defines and functions as an inductor, internal electrode layer 16 is provided as a coiled conductor. Specific examples of the magnetic ceramic material include a ferrite ceramic material, and the like.

The thickness of the fired ceramic layer 14 is preferably, for example, about 0.3 μm or more and about 50 μm or less. The number of stacked ceramic layers 14 is preferably, for example, 15 or more and 1200 or less. The number of ceramic layers 14 is equal to a sum of the number of ceramic layers 14 in inner layer portion 14b; and the number of ceramic layers 14 in outer layer portion 14a on each of the first main surface 12a side and the second main surface 12b side.

As a plurality of internal electrode layers 16, multilayer body 12 includes a plurality of first internal electrode layers 16a extending to first end surface 12e, and a plurality of second internal electrode layers 16b extending to second end surface 12f. The plurality of first internal electrode layers 16a and the plurality of second internal electrode layers 16b are embedded in inner layer portion 14b so as to be alternately arranged at equal or substantially equal intervals with ceramic layers 14 interposed therebetween in height direction x of multilayer body 12. The surfaces of first internal electrode layers 16a and second internal electrode layers 16b are parallel or substantially parallel to first main surface 12a and second main surface 12b and are, for example, rectangular or substantially rectangular in plan view.

As shown in FIG. 4, first internal electrode layers 16a are disposed on the respective ceramic layers 14 and located inside multilayer body 12. First internal electrode layer 16a includes a first facing electrode portion 26a that faces second internal electrode layer 16b, and a first extending electrode portion 28a located on one end side of first internal electrode layer 16a and extending from first facing electrode portion 26a to first end surface 12e, first side surface 12c, and second side surface 12d of multilayer body 12. As shown in FIG. 4, except for an end portion connected to first extending electrode portion 28a, first facing electrode portion 26a is not exposed from multilayer body 12 in plan view. An end portion of first extending electrode portion 28a extends to first end surface 12e, first side surface 12c, and second side surface 12d so as to be exposed from multilayer body 12. A distal end portion of first facing electrode portion 26a is located at a position receding from second end surface 12f in length direction z.

The shape of first facing electrode portion 26a in first internal electrode layer 16a is not particularly limited, but is preferably rectangular or substantially rectangular in plan view.

The shape of first extending electrode portion 28a in first internal electrode layer 16a is not particularly limited, but is preferably rectangular or substantially rectangular in plan view.

As shown in FIG. 5, second internal electrode layers 16b are disposed on the respective ceramic layers 14 and located inside multilayer body 12. Second internal electrode layer 16b includes a second facing electrode portion 26b that faces first internal electrode layer 16a, and a second extending electrode portion 28b located on one end side of second internal electrode layer 16b and extending from second facing electrode portion 26b to second end surface 12f, first side surface 12c, and second side surface 12d of multilayer body 12. As shown in FIG. 5, except for an end portion connected to second extending electrode portion 28b, second facing electrode portion 26b is not exposed from multilayer body 12 in plan view. An end portion of second extending electrode portion 28b extends to second end surface 12f, first side surface 12c, and second side surface 12d so as to be exposed from multilayer body 12. A distal end portion of second facing electrode portion 26b is located at a position receding from first end surface 12e in length direction z.

The shape of second facing electrode portion 26b in second internal electrode layer 16b is not particularly limited, but is preferably rectangular or substantially rectangular in plan view. In addition, the corners of second facing electrode portion 26b may be rounded in plan view, or may be oblique (tapered) in plan view, or may be tapered in plan view so as to be inclined to either side.

The shape of second extending electrode portion 28b in second internal electrode layer 16b is not particularly limited, but is preferably rectangular or substantially rectangular in plan view.

First internal electrode layer 16a and second internal electrode layer 16b can be made of an appropriate electrically conductive material, for example, metal such as Ni, Cu, Ag, Pd, or Au, or an alloy including at least one of these metals such as an Ag—Pd alloy. When multilayer body 12 including internal electrode layer 16 and an integrated component including external electrode 30 on the surface of multilayer body 12 are simultaneously fired, the metal forming internal electrode layer 16 forms a compound together with the metal included in external electrode 30.

The thickness of internal electrode layer 16, i.e., each of first internal electrode layers 16a and second internal electrode layers 16b, is preferably, for example, about 0.2 μm or more and about 3.0 μm or less.

The total number of first internal electrode layers 16a and second internal electrode layers 16b is preferably, for example, 10 or more and 1000 or less.

Multilayer body 12 includes a first auxiliary electrode layer 29a and a second auxiliary electrode layer 29b as a plurality of auxiliary electrode layers 29.

In inner layer portion 14b, first auxiliary electrode layer 29a is coplanar with ceramic layer 14 on which second internal electrode layer 16b is disposed, to be spaced apart from second internal electrode layer 16b, and to be exposed at first end surface 12e, first side surface 12c, and second side surface 12d. Further, first auxiliary electrode layer 29a of inner layer portion 14b faces first extending electrode portion 28a of first internal electrode layer 16a with ceramic layer 14 interposed therebetween.

In the present preferred embodiment, first auxiliary electrode layer 29a is disposed also in outer layer portion 14a. First auxiliary electrode layer 29a on first main surface 12a of outer layer portion 14a is disposed on ceramic layer 14 so as to be exposed at first main surface 12a, first end surface 12e, first side surface 12c, and second side surface 12d, for example, as shown in FIGS. 2 and 6. First auxiliary electrode layer 29a on second main surface 12b of outer layer portion 14a is disposed on ceramic layer 14 so as to be exposed at second main surface 12b, first end surface 12e, first side surface 12c, and second side surface 12d. Other first auxiliary electrode layers 29a in outer layer portion 14a are disposed on ceramic layers 14 so as to be exposed at first end surface 12e, first side surface 12c, and second side surface 12d. First auxiliary electrode layer 29a may not be disposed in outer layer portion 14a.

Since first auxiliary electrode layer 29a is disposed in inner layer portion 14b in this way, a first Cu plating layer 34a (described later) is readily provided on first end surface 12e, first side surface 12c, and second side surface 12d. In other words, not only first extending electrode portion 28a of first internal electrode layer 16a but also first auxiliary electrode layer 29a of inner layer portion 14b is exposed at first end surface 12e, first side surface 12c, and second side surface 12d. Thus, first Cu plating layer 34a is readily formed by a plating treatment over first end surface 12e, first side surface 12c, and second side surface 12d. Further, in the present preferred embodiment, outer layer portion 14a is provided with first auxiliary electrode layer 29a exposed at first main surface 12a and first auxiliary electrode layer 29a exposed at second main surface 12b, and thereby, first Cu plating layer 34a is readily formed by a plating treatment on first main surface 12a and second main surface 12b.

Further, by providing first auxiliary electrode layer 29a, the metal ratio enabling higher toughness than that of ceramic layer 14 of multilayer body 12 can be increased in two-terminal multilayer ceramic capacitor 10. As a result, the mechanical strength of two-terminal multilayer ceramic capacitor 10 can be improved, so that occurrence of cracks and fractures in two-terminal multilayer ceramic capacitor 10 can be reduced or prevented.

First auxiliary electrode layer 29a may be structured so as to be exposed only at first end surface 12e. Further, first extending electrode portion 28a may also be structured so as to be exposed only at first end surface 12e. In this case, not only first extending electrode portion 28a but also first auxiliary electrode layer 29a is exposed at first end surface 12e. Thus, first Cu plating layer 34a is readily formed by a plating treatment only on first end surface 12e.

Further, when first Cu plating layer 34a extends from first end surface 12e to reach first main surface 12a and second main surface 12b, first auxiliary electrode layer 29a may be structured so as to be exposed only at first main surface 12a and second main surface 12b. In other words, first auxiliary electrode layer 29a exposed at first main surface 12a and first auxiliary electrode layer 29a exposed at second main surface 12b should only be provided in outer layer portion 14a.

Further, first auxiliary electrode layer 29a is not exposed at first side surface 12c and second side surface 12d, but may be exposed only at first end surface 12e, first main surface 12a, and second main surface 12b. In this case, first Cu plating layer 34a extending from first end surface 12e to reach first main surface 12a and second main surface 12b is readily formed.

The shape of first auxiliary electrode layer 29a is not particularly limited, but is preferably rectangular or substantially rectangular in plan view.

In inner layer portion 14b, second auxiliary electrode layer 29b is coplanar with ceramic layer 14 on which first internal electrode layer 16a is disposed, to be spaced apart from first internal electrode layer 16a, and to be exposed at second end surface 12f, first side surface 12c, and second side surface 12d. Further, second auxiliary electrode layer 29b of inner layer portion 14b faces second extending electrode portion 28b of second internal electrode layer 16b with ceramic layer 14 interposed therebetween.

In the present preferred embodiment, second internal electrode layer 16b is disposed also in outer layer portion 14a. Second auxiliary electrode layer 29b on first main surface 12a of outer layer portion 14a is disposed on ceramic layer 14 so as to be exposed at first main surface 12a, second end surface 12f, first side surface 12c, and second side surface 12d, for example, as shown in FIGS. 2 and 6. Second auxiliary electrode layer 29b on second main surface 12b of outer layer portion 14a is disposed on ceramic layer 14 so as to be exposed at second main surface 12b, second end surface 12f, first side surface 12c, and second side surface 12d. Other second auxiliary electrode layers 29b in outer layer portion 14a are disposed on ceramic layers 14 so as to be exposed at second end surface 12f, first side surface 12c, and second side surface 12d. Second internal electrode layer 16b may not be provided in outer layer portion 14a.

Since second auxiliary electrode layer 29b is disposed in inner layer portion 14b in this way, a second Cu plating layer 34b (described later) is readily provided on second end surface 12f, first side surface 12c, and second side surface 12d. In other words, not only second extending electrode portion 28b of second internal electrode layer 16b but also second auxiliary electrode layer 29b of inner layer portion 14b is exposed at second end surface 12f, first side surface 12c, and second side surface 12d. Thus, second Cu plating layer 34b is readily formed by a plating treatment over second end surface 12f, first side surface 12c, and second side surface 12d. Further, in the present preferred embodiment, outer layer portion 14a is provided with second auxiliary electrode layer 29b exposed at first main surface 12a and second auxiliary electrode layer 29b exposed at second main surface 12b, and thus, second Cu plating layer 34b is readily formed by a plating treatment on first main surface 12a and second main surface 12b.

Further, by providing second auxiliary electrode layer 29b, the metal ratio allowing higher toughness than that of ceramic layer 14 of multilayer body 12 can be increased in two-terminal multilayer ceramic capacitor 10. As a result, the mechanical strength of two-terminal multilayer ceramic capacitor 10 can be improved, so that occurrence of cracks and fractures in two-terminal multilayer ceramic capacitor 10 can be reduced or prevented.

Second auxiliary electrode layer 29b may be exposed only at second end surface 12f. Further, second extending electrode portion 28b may also be exposed only at second end surface 12f. In this case, not only second extending electrode portion 28b but also second auxiliary electrode layer 29b is exposed at second end surface 12f. Thus, second Cu plating layer 34b is readily formed by a plating treatment only on second end surface 12f.

Further, when second Cu plating layer 34b extends from second end surface 12f so as to reach first main surface 12a and second main surface 12b, second auxiliary electrode layer 29b may be exposed only at first main surface 12a and second main surface 12b. In other words, second auxiliary electrode layer 29b exposed at first main surface 12a and second auxiliary electrode layer 29b exposed at second main surface 12b should only be provided in outer layer portion 14a.

Further, second auxiliary electrode layer 29b is not exposed at first side surface 12c and second side surface 12d, but may be exposed only at second end surface 12f, first main surface 12a, and second main surface 12b. In this case, second Cu plating layer 34b extending from second end surface 12f to reach first main surface 12a and second main surface 12b is readily provided.

The shape of second auxiliary electrode layer 29b is not particularly limited, but is preferably rectangular or substantially rectangular in plan view.

For example, similarly to internal electrode layer 16, first auxiliary electrode layer 29a and second auxiliary electrode layer 29b can be made of an appropriate electrically conductive material, for example, metal such as Ni, Cu, Ag, Pd, or Au, or an alloy including at least one of these metals such as an Ag—Pd alloy.

The thickness of each of first auxiliary electrode layer 29a and second auxiliary electrode layer 29b is preferably about 0.2 μm or more and about 3.0 μm or less, for example.

Dimension L of the distance in length direction z between second internal electrode layer 16b and first auxiliary electrode layer 29a is preferably, for example, about 0.04 mm or more. Similarly, dimension L of the distance in length direction z between first internal electrode layer 16a and second auxiliary electrode layer 29b is preferably, for example, about 0.04 mm or more.

(2) External Electrode

As shown in FIGS. 1 to 3, external electrode 30 is disposed on each of the first end surface 12e side and the second end surface 12f side of multilayer body 12.

External electrode 30 includes a first external electrode 30a and a second external electrode 30b.

First external electrode 30a is connected to first internal electrode layer 16a and disposed at least on first end surface 12e. In this case, first external electrode 30a is electrically connected to first extending electrode portion 28a of first internal electrode layer 16a and first auxiliary electrode layer 29a. In the present preferred embodiment, without limitation, first external electrode 30a is disposed in multilayer body 12 so as to extend from first end surface 12e to a portion of first main surface 12a, a portion of second main surface 12b, a portion of first side surface 12c, and a portion of second side surface 12d.

Second external electrode 30b is connected to second internal electrode layer 16b and disposed at least on second end surface 12f. In this case, second external electrode 30b is electrically connected to second extending electrode portion 28b of second internal electrode layer 16b and second auxiliary electrode layer 29b. In the present preferred embodiment, without limitation, second external electrode 30b is disposed so as to extend from second end surface 12f to a portion of first main surface 12a, a portion of second main surface 12b, a portion of first side surface 12c, and a portion of second side surface 12d.

Inside multilayer body 12, first facing electrode portion 26a of first internal electrode layer 16a and second facing electrode portion 26b of second internal electrode layer 16b face each other with ceramic layer 14 interposed therebetween, to thus generate a capacitance. Thus, a capacitance can be obtained between first external electrode 30a to which first internal electrode layer 16a is connected and second external electrode 30b to which second internal electrode layer 16b is connected, with the result that the capacitor characteristics occur.

The thickness of each of first external electrode 30a and second external electrode 30b is preferably about 6.0 μm or more and about 60.0 μm or less, for example.

External electrode 30 is formed of a plating layer. In the present preferred embodiment, external electrode 30 includes a lower Cu plating layer 34, an upper Cu plating layer 35, and an outer plating layer 36. Outer plating layer 36 may not be provided.

First external electrode 30a includes a first Cu plating layer 34a, a third Cu plating layer 35a disposed on first Cu plating layer 34a, and a first outer plating layer 36a disposed on third Cu plating layer 35a. First external electrode 30a includes no underlying electrode layer and first Cu plating layer 34a is formed directly on multilayer body 12.

Second external electrode 30b includes a second Cu plating layer 34b, a fourth Cu plating layer 35b disposed on second Cu plating layer 34b, and a second outer plating layer 36b disposed on fourth Cu plating layer 35b. Second external electrode 30b includes no underlying electrode layer, and second Cu plating layer 34b is formed directly on multilayer body 12.

(2-1) First Cu Plating Layer and Second Cu Plating Layer

First Cu plating layer 34a is disposed on first end surface 12e of multilayer body 12 and extends from first end surface 12e so as to cover a portion of first main surface 12a, a portion of second main surface 12b, a portion of first side surface 12c, and a portion of second side surface 12d. In this case, first Cu plating layer 34a is electrically connected to first extending electrode portion 28a of first internal electrode layer 16a and first auxiliary electrode layer 29a.

Second Cu plating layer 34b is disposed on second end surface 12f of multilayer body 12 and extends from second end surface 12f so as to cover a portion of first main surface 12a, a portion of second main surface 12b, a portion of first side surface 12c, and a portion of second side surface 12d. In this case, second Cu plating layer 34b is electrically connected to second extending electrode portion 28b of second internal electrode layer 16b and second auxiliary electrode layer 29b.

First Cu plating layer 34a may be disposed only on first end surface 12e of multilayer body 12, and second Cu plating layer 34b may be disposed only on second end surface 12f of multilayer body 12.

The average number of Cu particles is, for example, about 1.5 or less in any two or more first square regions 40a (FIG. 7) of first Cu plating layer 34a on the first end surface 12e side and also is about 1.5 or less in any two or more second square regions 40b (FIG. 7) of second Cu plating layer 34b on the second end surface 12f side. Each of first square regions 40a and second square regions 40b has a square or substantially square shape with each side having a length of about 2 μm.

The average number of Cu particles in first square regions 40a is calculated, for example, by the following method.

The cross section of two-terminal multilayer ceramic capacitor 10 is polished in the plane direction parallel or substantially parallel to first side surface 12c and second side surface 12d, for example, to about ½ of dimension W of two-terminal multilayer ceramic capacitor 10 in width direction y. Then, focused ion beam (FIB) processing is performed to process the area surrounding an arbitrary position where Cu particles are counted on the polished surface obtained by cross-section polishing. Then, the polished surface is observed by a scanning ion microscope (SIM) at a magnification of 10000×. From the SIM image of the polished surface, first square regions 40a at two or more portions (four portions in the present preferred embodiment) in first Cu plating layer 34a are selected. The number of Cu particles entirely or partially observed in each of first square regions 40a is counted. The average number of the Cu particles in four first square regions 40a is defined as an average number of Cu particles. The diameter of each of the Cu particles to be counted is, for example, about 0.02 μm or more.

Further, the cross section of two-terminal multilayer ceramic capacitor 10 may be polished along a plane parallel or substantially parallel to first main surface 12a and second main surface 12b, and the exposed surface may be defined as the polished surface. Further, the cross section of two-terminal multilayer ceramic capacitor 10 may be polished along a plane parallel or substantially parallel to first side surface 12c and second side surface 12d, and the exposed surface may be defined as the polished surface.

As second square region 40b, four portions in second Cu plating layer 34b are selected on the polished surface. The method of calculating the average number of Cu particles in second square regions 40b is the same as described above.

Since the average number of Cu particles is, for example, about 1.5 or less in first square regions 40a of first Cu plating layer 34a and is about 1.5 or less in second square regions 40b of second Cu plating layer 34b, the area of adhesion between first Cu plating layer 34a and first internal electrode layer 16a increases while the area of adhesion between second Cu plating layer 34b and second internal electrode layer 16b increases. Thus, the adhesive strength between first Cu plating layer 34a and first internal electrode layer 16a can be improved while the adhesive strength between second Cu plating layer 34b and second internal electrode layer 16b can be improved. As a result, the adhesive strength between first external electrode 30a including first Cu plating layer 34a and first internal electrode layer 16a can be improved while the adhesive strength between second external electrode 30b including second Cu plating layer 34b and second internal electrode layer 16b can be improved. Further, the ESR in the region including each of these adhesion portions can be reduced.

The Cu content in each of first Cu plating layer 34a and second Cu plating layer 34b is preferably, for example, about 60% or more. When the Cu content is about 60% or more, Cu is sufficiently diffused from first Cu plating layer 34a to first internal electrode layer 16a, and also from second Cu plating layer 34b to second internal electrode layer 16b. Thus, the adhesive strength between first Cu plating layer 34a and first internal electrode layer 16a can be improved while the adhesive strength between second Cu plating layer 34b and second internal electrode layer 16b can be improved.

The Cu content in each of first Cu plating layer 34a and second Cu plating layer 34b is calculated, for example, by the following method.

The cross section of two-terminal multilayer ceramic capacitor 10 is polished in the plane direction parallel or substantially parallel to first side surface 12c and second side surface 12d, for example, to about ½ of dimension W of two-terminal multilayer ceramic capacitor 10 in width direction y. Then, a thickness d1 of an Ni metal portion in each of first Cu plating layer 34a and second Cu plating layer 34b is measured in the thickness direction (length direction z) of the Cu plating layer at an arbitrary position on the polished surface obtained by cross-section polishing. The Ni metal portion is formed by diffusion of Ni from each of first internal electrode layer 16a and second internal electrode layer 16b. Assuming that the entire thickness of Cu plating layers including first Cu plating layer 34a and second Cu plating layer 34b is defined as d2, the Cu content is obtained by (d2−d1)/d2. The average value measured at arbitrary two points is defined as a Cu content.

In this case, first Cu plating layer 34a includes a region that is adjacent to first end surface 12e and where Ni is diffused. This region in first Cu plating layer 34a is referred to as a first Ni diffusion region. The first Ni diffusion region preferably has a length of, for example, about ⅖ or less of the first length (described later) in length direction z. Second Cu plating layer 34b includes a region that is adjacent to second end surface 12f and where Ni is diffused. This region in second Cu plating layer 34b is referred to as a second Ni diffusion region. The second Ni diffusion region preferably has a length of, for example, about ⅖ or less of the second length (described later) in length direction z.

This makes it possible to increase the Cu content in the vicinity of the interface between first Cu plating layer 34a and third Cu plating layer 35a, and the interface between second Cu plating layer 34b and fourth Cu plating layer 35b. Thus, the adhesive strength between first Cu plating layer 34a and third Cu plating layer 35a can be improved while the adhesive strength between second Cu plating layer 34b and fourth Cu plating layer 35b can be improved.

The thickness of each of first Cu plating layer 34a and second Cu plating layer 34b is, for example, about 2 μm or more and about 15 μm or less, for example.

Each of first Cu plating layer 34a and second Cu plating layer 34b preferably includes no glass component.

The metal ratio per unit area in each of first Cu plating layer 34a and second Cu plating layer 34b is preferably, for example, about 99% by volume.

(2-2) Third Cu Plating Layer and Fourth Cu Plating Layer

Third Cu plating layer 35a is disposed on first Cu plating layer 34a so as to cover first Cu plating layer 34a. Fourth Cu plating layer 35b is disposed on second Cu plating layer 34b so as to cover second Cu plating layer 34b.

The average number of Cu particles is, for example, more than about 1.5 in any two or more third square regions 41a of third Cu plating layer 35a on the first end surface 12e side and is more than about 1.5 in any two or more fourth square regions 41b of fourth Cu plating layer 35b on the second end surface 12f side. Each of third square regions 41a and fourth square regions 41b has a square shape with each side having a length of about 2 μm, for example.

Each of the average number of Cu particles in third square regions 41a and the average number of Cu particles in fourth square regions 41b is calculated by the same method as that for first square regions 40a.

Since the number of Cu particles is more than about 1.5 in third square regions 41a of third Cu plating layer 35a and is more than about 1.5 in fourth square regions 41b of fourth Cu plating layer 35b, the mechanical strength of third Cu plating layer 35a and fourth Cu plating layer 35b can be improved. Therefore, the mechanical strength of first external electrode 30a including third Cu plating layer 35a can be improved while the mechanical strength of second external electrode 30b including fourth Cu plating layer 35b can be improved.

In this way, the number of Cu particles in each of first Cu plating layer 34a and second Cu plating layer 34b is reduced, whereas third Cu plating layer 35a and fourth Cu plating layer 35b are have a larger number of Cu particles than first Cu plating layer 34a and second Cu plating layer 34b. Thus, entirely in first external electrode 30a and second external electrode 30b, the strength of adhesion to first internal electrode layer 16a and second internal electrode layer 16b can be improved, the ESR can be reduced, and also the mechanical strength can be improved.

The Cu content in each of third Cu plating layer 35a and fourth Cu plating layer 35b is preferably, for example, about 95% or more. When the Cu content in each of third Cu plating layer 35a and fourth Cu plating layer 35b is about 95% or more, the adhesive strength between first Cu plating layer 34a and third Cu plating layer 35a is improved while the adhesive strength between second Cu plating layer 34b and fourth Cu plating layer 35b is improved. Thus, peeling-off of third Cu plating layer 35a from first Cu plating layer 34a can be reduced or prevented, peeling-off of fourth Cu plating layer 35b from second Cu plating layer 34b can be reduced or prevented, and also, an increase in insulation resistance of first external electrode 30a and second external electrode 30b can be reduced or prevented.

The thickness of each of third Cu plating layer 35a and fourth Cu plating layer 35b is about 2 μm or more and about 15 μm or less, for example.

Each of third Cu plating layer 35a and fourth Cu plating layer 35b preferably includes no glass component.

The metal ratio per unit area in each of third Cu plating layer 35a and fourth Cu plating layer 35b is preferably, for example, about 99% by volume.

(2-3) First Outer Plating Layer and Second Outer Plating Layer

First outer plating layer 36a is disposed on third Cu plating layer 35a. Second outer plating layer 36b is disposed on fourth Cu plating layer 35b.

First outer plating layer 36a and second outer plating layer 36b include, for example, at least one selected from Cu, Ni, Sn, Ag, Pd, an Ag—Pd alloy, Au, and the like.

First outer plating layer 36a and second outer plating layer 36b each may include a plurality of layers. In this case, first outer plating layer 36a and second outer plating layer 36b each preferably have a two-layer structure including, for example, a lower plating layer plated with Ni (an Ni plating layer) and an upper plating layer plated with Sn (an Sn plating layer) that is provided on the lower plating layer.

In other words, first outer plating layer 36a includes a first lower plating layer and a first upper plating layer located on the surface of the first lower plating layer.

Also, second outer plating layer 36b includes a second lower plating layer and a second upper plating layer located on the surface of the second lower plating layer.

The lower plating layer plated with Ni is used to prevent first Cu plating layer 34a (second Cu plating layer 34b) and/or third Cu plating layer 35a (fourth Cu plating layer 35b) from being eroded by solder used when two-terminal multilayer ceramic capacitor 10 is mounted. Further, the upper plating layer plated with Sn is used to improve solder wettability when two-terminal multilayer ceramic capacitor 10 is mounted, so that two-terminal multilayer ceramic capacitor 10 can be readily mounted.

The thickness of the Ni plating is preferably, for example, about 1.0 μm or more and about 15.0 μm or less. The thickness of the Sn plating is preferably, for example, about 1.0 μm or more and about 15.0 μm or less.

First outer plating layer 36a may cover only first Cu plating layer 34a, and second outer plating layer 36b may cover only second Cu plating layer 34b. Further, first outer plating layer 36a may cover both first Cu plating layer 34a and third Cu plating layer 35a, and second outer plating layer 36b may cover both second Cu plating layer 34b and fourth Cu plating layer 35b.

(3) Dimensions of Two-Terminal Multilayer Ceramic Capacitor

Herein, dimension L indicates the dimension in length direction z of two-terminal multilayer ceramic capacitor 10 including multilayer body 12, first external electrode 30a, and second external electrode 30b. Dimension T indicates the dimension in height direction x of two-terminal multilayer ceramic capacitor 10 including multilayer body 12, first external electrode 30a, and second external electrode 30b. Dimension W indicates the dimension in width direction y of two-terminal multilayer ceramic capacitor 10 including multilayer body 12, first external electrode 30a, and second external electrode 30b.

As the dimensions of two-terminal multilayer ceramic capacitor 10, for example, L dimension in length direction z is about 0.2 mm or more and about 10.0 mm or less, dimension W in width direction y is about 0.1 mm or more and about 10.0 mm or less, and dimension T in height direction x is about 0.1 mm or more and about 5.0 mm or less. The dimensions of two-terminal multilayer ceramic capacitor 10 can be measured by a microscope.

2.2 Method of Manufacturing Two-Terminal Multilayer Ceramic Capacitor

The following describes a non-limiting example of a method of manufacturing two-terminal multilayer ceramic capacitor 10.

First, a dielectric sheet for a ceramic layer, a conductive paste for an internal electrode layer, and a conductive paste for an auxiliary electrode layer are prepared. Each of the dielectric sheet, the conductive paste for an internal electrode layer, and the conductive paste for an auxiliary electrode layer includes a binder and a solvent. In this case, for example, a known binder and a known solvent may be used.

Then, the conductive paste for an internal electrode layer and the conductive paste for an auxiliary electrode layer are printed on the dielectric sheet in a prescribed pattern, for example, by screen printing or gravure printing. Thus, a dielectric sheet on which a pattern of the first internal electrode layer and a pattern of the second auxiliary electrode layer are formed is prepared, and a dielectric sheet on which a pattern of the second internal electrode layer and a pattern of the first auxiliary electrode layer are formed is prepared.

As to the dielectric sheet, when an auxiliary electrode layer is formed in an outer layer portion, a dielectric sheet for an outer layer is prepared in which a pattern of the auxiliary electrode layer is printed but a pattern of the internal electrode layer is not printed. When an auxiliary electrode layer is not formed in the outer layer portion, a dielectric sheet for an outer layer is prepared in which a pattern of the internal electrode layer and a pattern of the auxiliary electrode layer are not printed.

Then, a prescribed number of dielectric sheets for outer layers are stacked to form a portion to be provided as a second main surface-side outer layer portion on the second main surface side. Then, a dielectric sheet having a pattern of the first internal electrode layer and a pattern of the second auxiliary electrode layer printed thereon and a dielectric sheet having a pattern of the second internal electrode layer and a pattern of the first auxiliary electrode layer printed thereon are sequentially stacked on a portion to be provided as the second main surface-side outer layer portion so as to form the structure of the present invention. Thus, a portion to be provided as an inner layer portion is formed. Then, a prescribed number of dielectric sheets for outer layers are stacked on this portion to be provided as an inner layer portion, to thereby form a portion to be provided as the first main surface-side outer layer portion on the first main surface side. Thus, a multilayer sheet is produced.

Then, the multilayer sheet is pressed in the stacking direction by, for example, as hydrostatic pressing to produce a multilayer block.

Then, the multilayer block is cut into a prescribed size to cut out multilayer chips. At this time, the corners and the ridges of each multilayer chip may be rounded by barrel polishing or the like.

Then, each multilayer chip is fired to form multilayer body 12. The firing temperature, which depends on the materials of the internal electrode layer and the ceramic layer as a dielectric, is preferably, for example, about 900° C. or higher and about 1400° C. or lower.

A plating treatment is performed in prescribed portions on first main surface 12a, second main surface 12b, first end surface 12e, second end surface 12f, first side surface 12c, and second side surface 12d of multilayer body 12 to thus form first Cu plating layer 34a and second Cu plating layer 34b. Specifically, a plating treatment is performed to form first Cu plating layer 34a on first internal electrode layer 16a exposed at first end surface 12e, first side surface 12c, and second side surface 12d, and first auxiliary electrode layer 29a exposed at first main surface 12a, second main surface 12b, first end surface 12e, first side surface 12c, and second side surface 12d. Also, a plating treatment is performed to form second Cu plating layer 34b on second internal electrode layer 16b exposed at second end surface 12f, first side surface 12c, and second side surface 12d, and second auxiliary electrode layer 29b exposed at first main surface 12a, second main surface 12b, second end surface 12f, first side surface 12c, and second side surface 12d. In the plating treatment, for example, either electrolytic plating or electroless plating may be adopted, but electroless plating requires a pretreatment with a catalyst or the like in order to improve the plating precipitation speed, which disadvantageously complicates the process. Thus, it is usually preferable to use electrolytic plating. As a plating method, for example, barrel plating is preferably used.

After first Cu plating layer 34a and second Cu plating layer 34b are formed, multilayer body 12 is heat-treated at, for example, about 600° C. or higher and about 900° C. or lower. The heat treatment is performed in a nitrogen atmosphere for about 1 minute or longer and about 5 minutes or shorter in the state in which the actually measured peak temperature is maintained at, for example, about 700° C. or higher and about 800° C. or lower. In the present preferred embodiment, the heat treatment is performed using, for example, a continuous heat treatment furnace.

By performing the heat treatment, the average number of Cu particles can be about 1.5 or less in first square regions 40a of first Cu plating layer 34a and also in second square regions 40b of second Cu plating layer 34b. In the heat treatment, the metal (Cu or the like) in first Cu plating layer 34a and the metal (Ni or the like) in first internal electrode layer 16a are mutually diffused while the metal (Cu or the like) in second Cu plating layer 34b and the metal (Ni or the like) in second internal electrode layer 16b are mutually diffused. Thus, the adhesive strength between first Cu plating layer 34a and first internal electrode layer 16a can be improved, the adhesive strength between second Cu plating layer 34b and second internal electrode layer 16b can be improved, and the ESR in the region including each of these adhesion portions can be reduced.

When the temperature in the heat treatment is lower than about 600° C., the adhesive strength between first Cu plating layer 34a and first internal electrode layer 16a becomes insufficient, the adhesive strength between second Cu plating layer 34b and second internal electrode layer 16b becomes insufficient, and the ESR increases. When the temperature in the heat treatment is higher than about 900° C., diffusion of Cu atoms from first Cu plating layer 34a to first internal electrode layer 16a becomes excessive, and diffusion of Cu atoms from second Cu plating layer 34b to second internal electrode layer 16b becomes excessive. This produces voids in first Cu plating layer 34a and second Cu plating layer 34b, and moisture enters the voids, so that the moisture resistance decreases.

Then, third Cu plating layer 35a and fourth Cu plating layer 35b are formed by a plating treatment on first Cu plating layer 34a and second Cu plating layer 34b, respectively. The plating treatment performed in this case is similar to that in the case where first Cu plating layer 34a and second Cu plating layer 34b are formed, but no heat treatment is performed after the plating treatment.

Further, by the same plating treatment as described above, first outer plating layer 36a is formed to cover first Cu plating layer 34a and third Cu plating layer 35a while second outer plating layer 36b is formed to cover second Cu plating layer 34b and fourth Cu plating layer 35b. In the present preferred embodiment, first outer plating layer 36a and second outer plating layer 36b each are formed by sequentially stacking the lower plating layer plated with Ni and the upper plating layer plated with Sn.

As described above, two-terminal multilayer ceramic capacitor 10 according to the present preferred embodiment is manufactured.

In the present preferred embodiment, first auxiliary electrode layer 29a may not be provided as long as first extending electrode portion 28a exposed at least at first end surface 12e can ensure the adhesive strength between first Cu plating layer 34a and first internal electrode layer 16a. Similarly, second auxiliary electrode layer 29b may not be provided as long as second extending electrode portion 28b exposed at least at second end surface 12f can ensure the adhesive strength between second Cu plating layer 34b and first internal electrode layer 16a.

Second Preferred Embodiment

1. Three-Terminal Multilayer Ceramic Capacitor

The following describes a three-terminal multilayer ceramic capacitor as an example of a multilayer ceramic electronic component according to a second preferred embodiment of the present invention.

Figure 8:
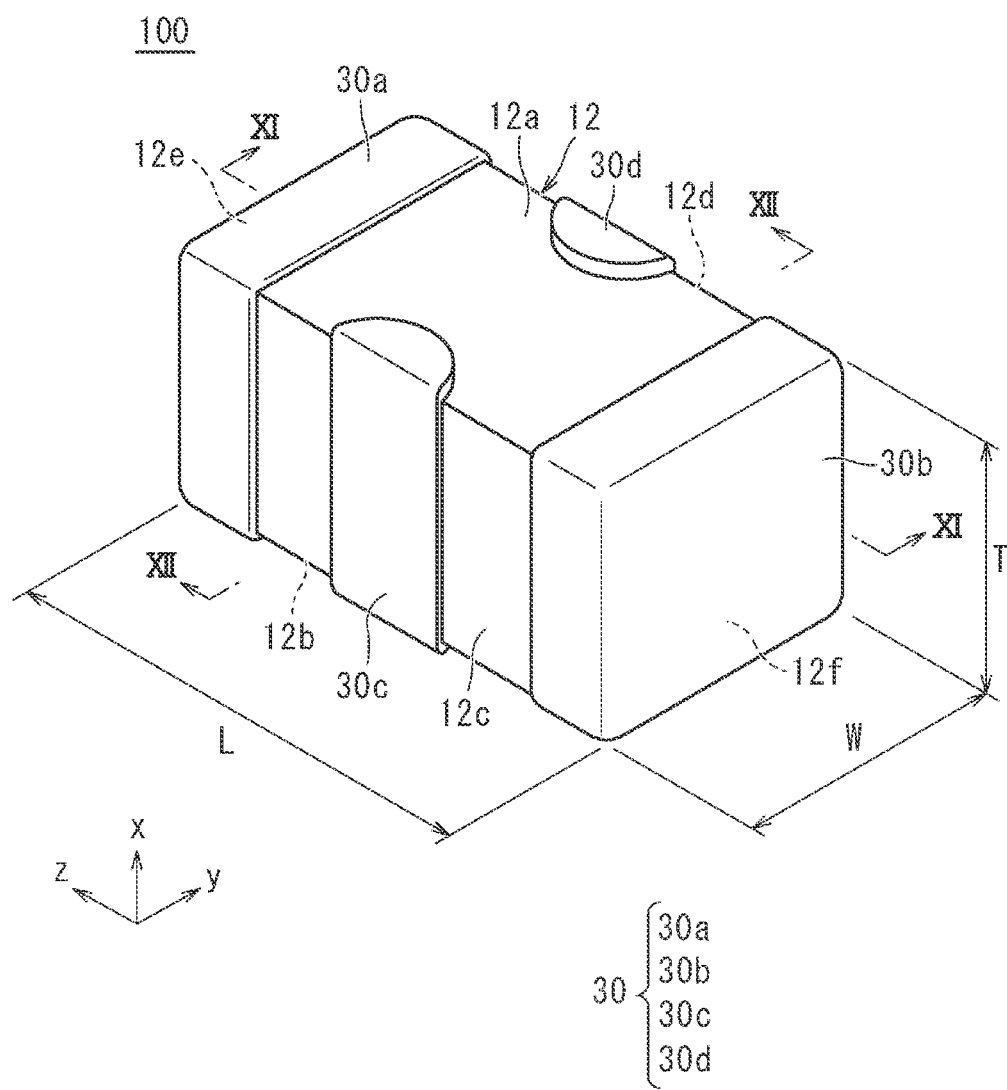
FIG. 8 is an external perspective view showing one example of a three-terminal multilayer ceramic capacitor according to a second preferred embodiment of the present invention.
Figure 9:
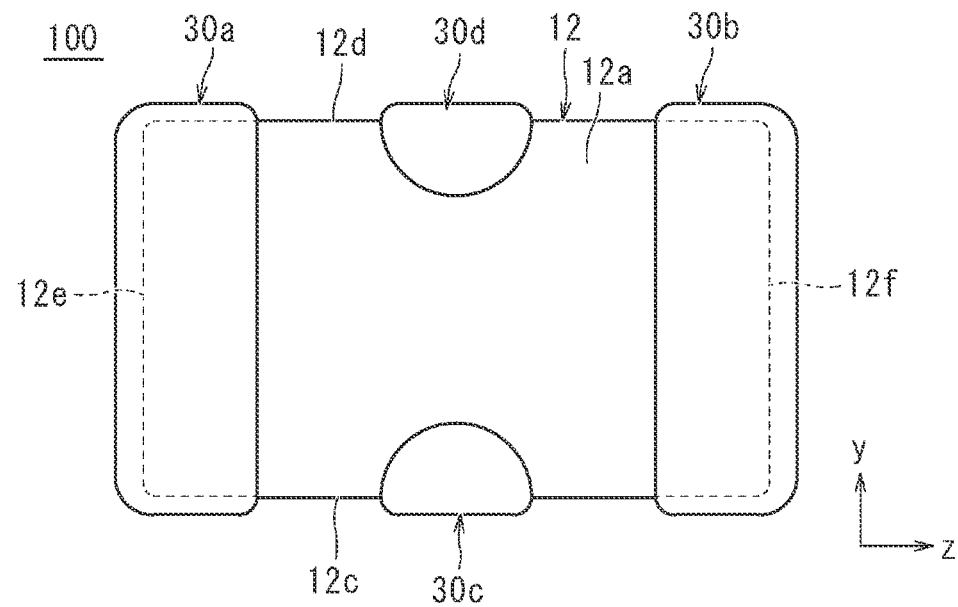
FIG. 9 is a top view showing one example of the three-terminal multilayer ceramic capacitor according to the second preferred embodiment of the present invention.
Figure 10:
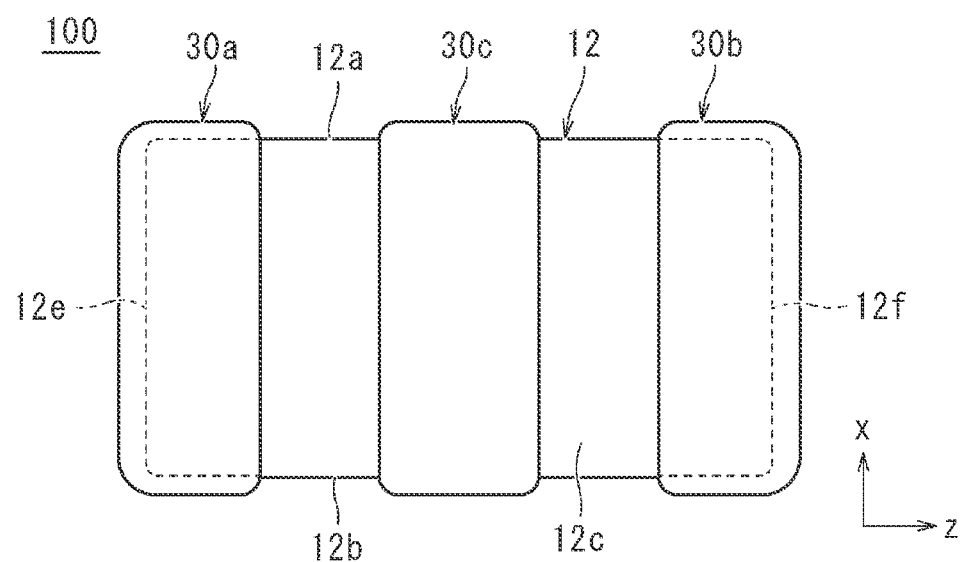
FIG. 10 is a front view showing one example of the three-terminal multilayer ceramic capacitor according to the second preferred embodiment of the present invention.
Figure 11:
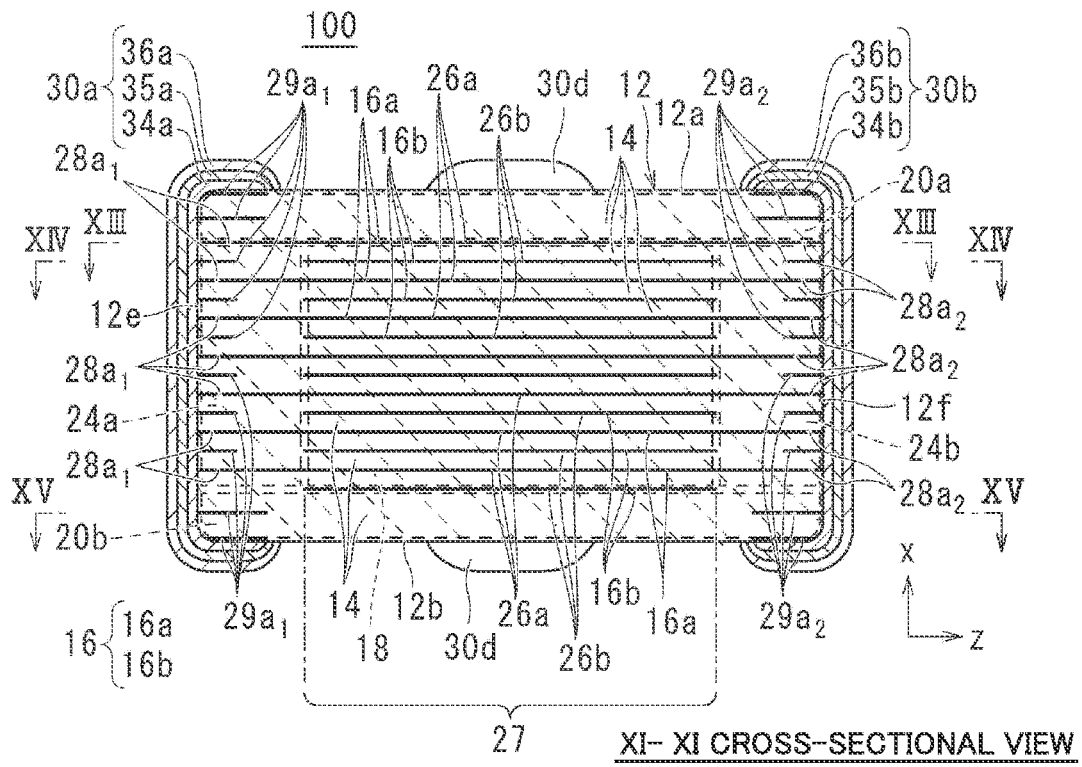
FIG. 11 is a cross-sectional view taken along a line XI-XI in FIG. 8.
Figure 12:
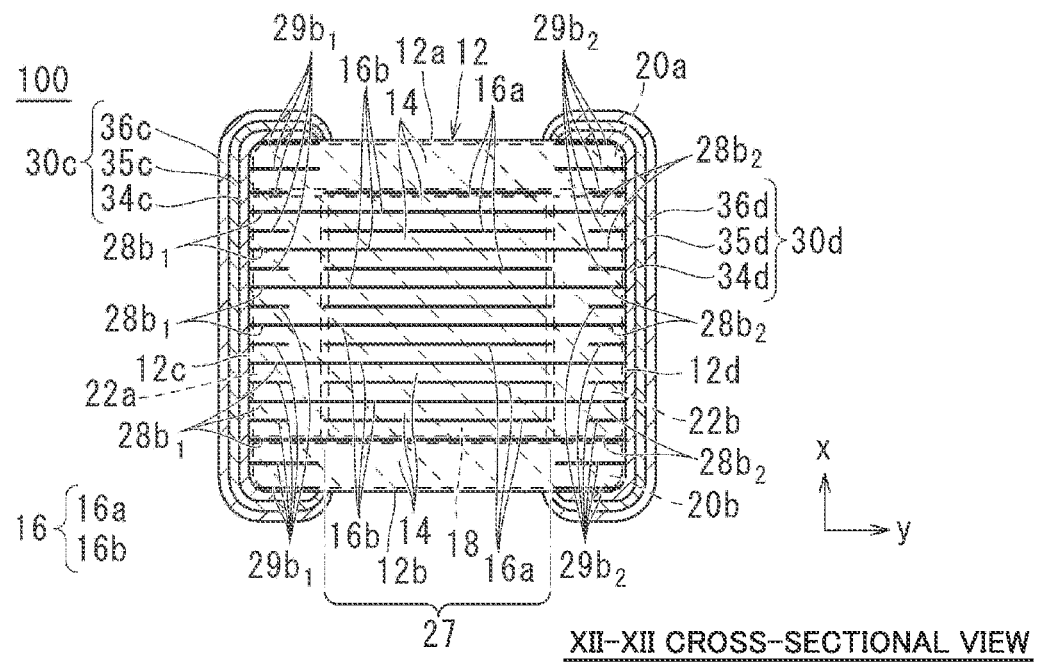
FIG. 12 is a cross-sectional view taken along a line XII-XII in FIG. 8.
Figure 13:
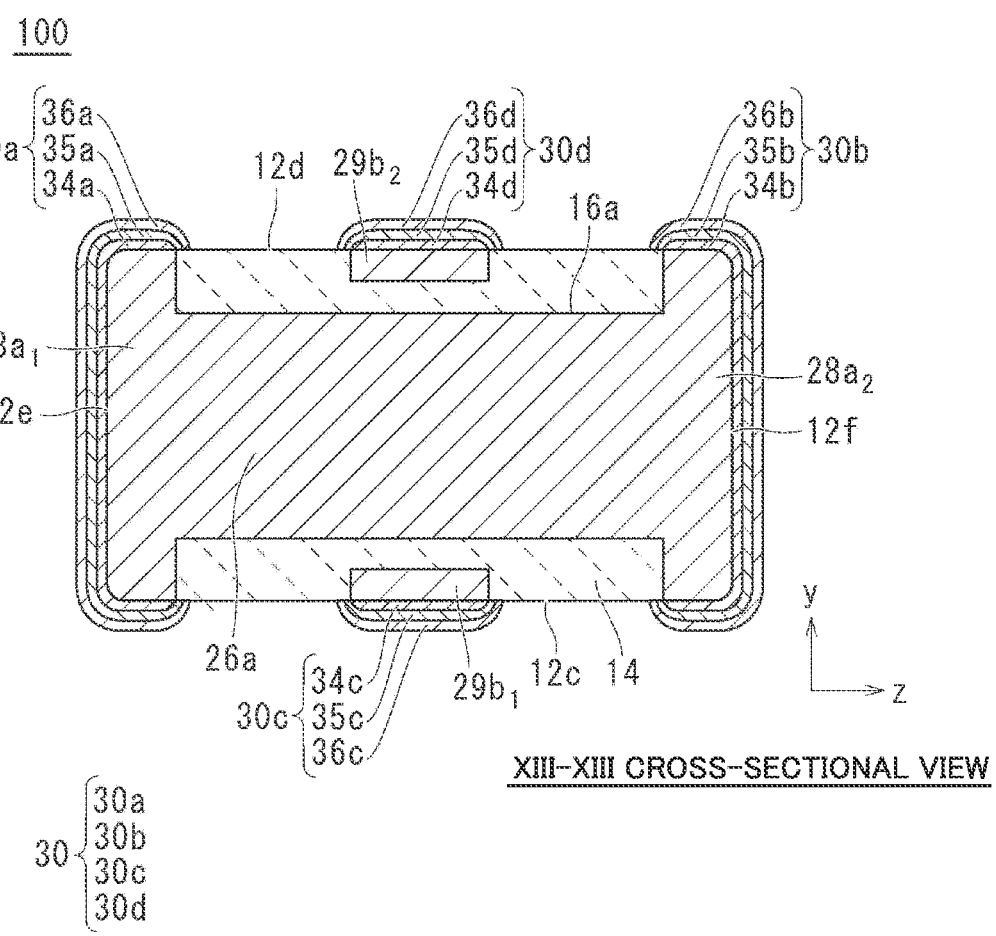
FIG. 13 is a cross-sectional view taken along a line XIII-XIII in FIG. 11.
Figure 14:
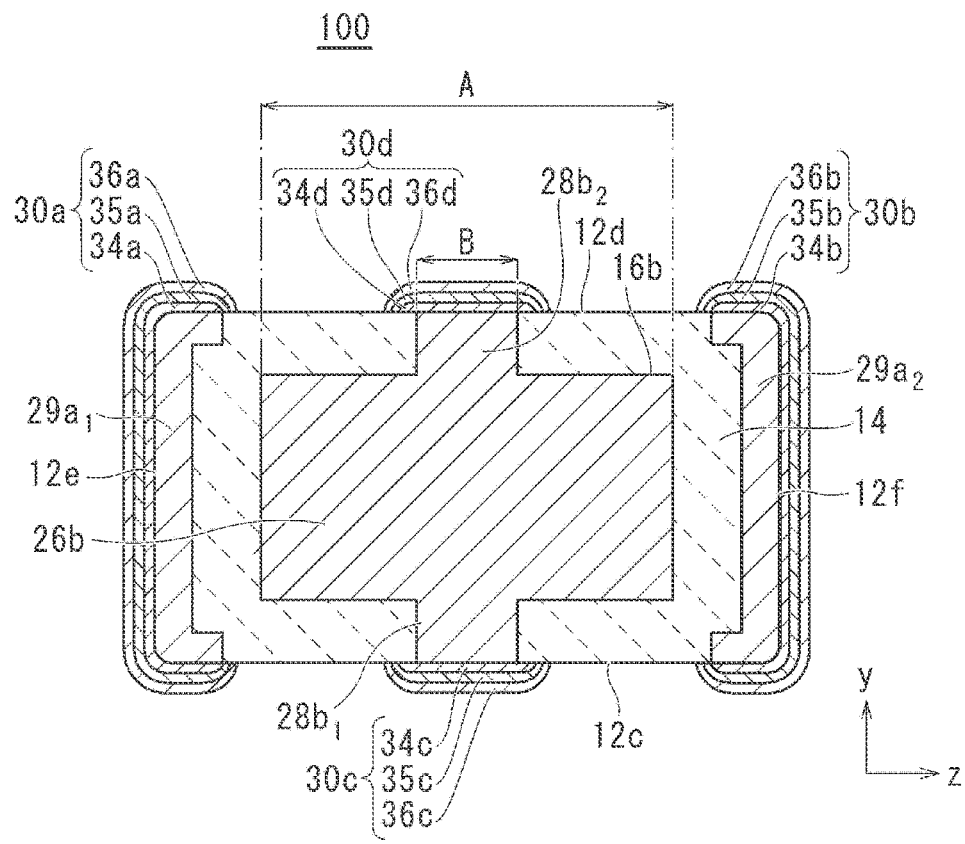
FIG. 14 is a cross-sectional view taken along a line XIV-XIV in FIG. 11.
Figure 15:
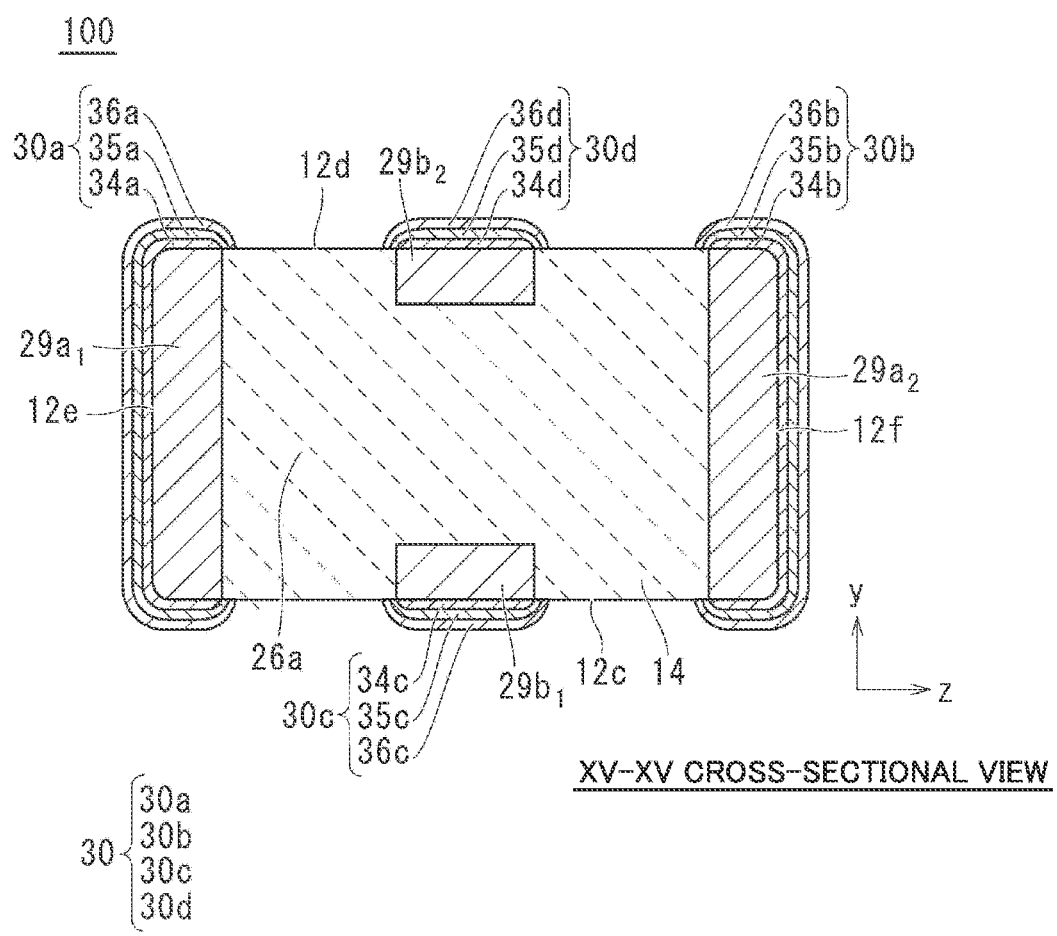
FIG. 15 is a cross-sectional view taken along a line XV-XV in FIG. 11.
Figure 16:
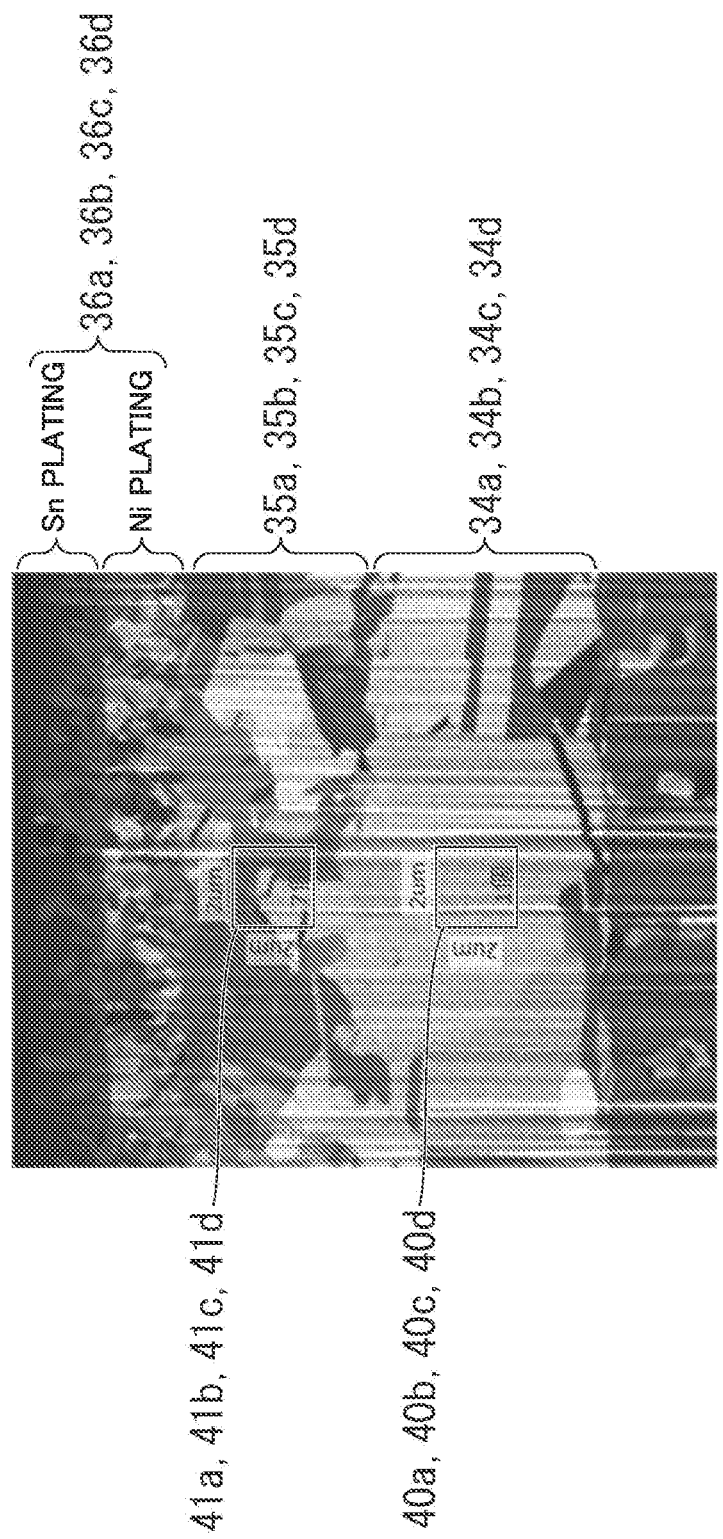
FIG. 16 is a cross-sectional view showing a first square region to a fourth square region.

FIG. 8 is an external perspective view showing one example of the three-terminal multilayer ceramic capacitor according to the second preferred embodiment of the present invention. FIG. 9 is a top view showing one example of the three-terminal multilayer ceramic capacitor according to the second preferred embodiment of the present invention. FIG. 10 is a front view showing one example of the three-terminal multilayer ceramic capacitor according to the second preferred embodiment of the present invention. FIG. 11 is a cross-sectional view taken along a line XI-XI in FIG. 8. FIG. 12 is a cross-sectional view taken along a line XII-XII in FIG. 8. FIG. 13 is a cross-sectional view taken along a line XIII-XIII in FIG. 11. FIG. 14 is a cross-sectional view taken along a line XIV-XIV in FIG. 11. FIG. 15 is a cross-sectional view taken along a line XV-XV in FIG. 11. FIG. 16 is a cross-sectional view showing the first square region to the fourth square region.

As shown in FIG. 8, three-terminal multilayer ceramic capacitor 100 includes, for example, a multilayer body 12 having a rectangular or substantially rectangular parallelepiped shape and an external electrode 30.

Multilayer body 12 includes a plurality of stacked ceramic layers 14, a plurality of internal electrode layers 16 respectively stacked on ceramic layers 14, and a plurality of auxiliary electrode layers $29a_1$, $29a_2$, $29b_1$, and $29b_2$. Ceramic layers 14 and internal electrode layers 16 are stacked in height direction x.

Multilayer body 12 includes a first main surface 12a and a second main surface 12b that are opposite to each other in height direction x, a first side surface 12c and a second side surface 12d that are opposite to each other in width direction y orthogonal or substantially orthogonal to height direction x, and a first end surface 12e and a second end surface 12f that are opposite to each other in length direction z orthogonal or substantially orthogonal to height direction x and width direction y. Multilayer body 12 includes corners and ridges, each of which is rounded. A corner corresponds to a portion at which adjoining three planes of multilayer body 12 meet, and a ridge corresponds to a portion at which adjoining two planes of multilayer body 12 meet. Further, protrusions and recesses or the like may be provided partially or entirely in first and second main surfaces 12a and 12b, first and second side surfaces 12c and 12d, and first and second end surfaces 12e and 12f.

In multilayer body 12, dimension L in length direction z is not necessarily longer than dimension W in width direction y.

Multilayer body 12 includes an inner layer portion 18, and a first main surface-side outer layer portion 20a and a second main surface-side outer layer portion 20b that sandwich inner layer portion 18 in the stacking direction.

Inner layer portion 18 includes a plurality of ceramic layers 14 and a plurality of internal electrode layers 16. Inner layer portion 18 includes internal electrode layers 16 from an internal electrode layer 16 located closest to first main surface 12a in the stacking direction to an internal electrode layer 16 located closest to second main surface 12b in the stacking direction. Internal electrode layer 16 includes a first internal electrode layer 16a extending to first end surface 12e and second end surface 12f, and a second internal electrode layer 16b extending to first side surface 12c and second side surface 12d. In inner layer portion 18, a plurality of first internal electrode layers 16a and a plurality of second internal electrode layers 16b respectively face each other with ceramic layers 14 interposed therebetween. Inner layer portion 18 generates a capacitance and substantially defines and functions as a capacitor.

First main surface-side outer layer portion 20a includes a plurality of ceramic layers 14 located on the first main surface 12a side and located between first main surface 12a and the outermost surface of inner layer portion 18 on the first main surface 12a side and a straight line extending in the direction along this outermost surface, and a plurality of first auxiliary electrode layers $29a_1$, a plurality of second auxiliary electrode layers $29a_2$ (FIG. 11), a plurality of third auxiliary electrode layers $29b_1$, and a plurality of fourth auxiliary electrode layers $29b_2$ (FIG. 12) that are disposed on the plurality of ceramic layers 14. First main surface-side outer layer portion 20a includes the plurality of ceramic layers 14 located between first main surface 12a and internal electrode layer 16 closest to first main surface 12a, and the plurality of first auxiliary electrode layers $29a_1$, the plurality of second auxiliary electrode layers $29a_2$, the plurality of third auxiliary electrode layers $29b_1$, and the plurality of fourth auxiliary electrode layers $29b_2$ that are disposed on the plurality of ceramic layers 14. Ceramic layers 14 used in first main surface-side outer layer portion 20a may be the same as ceramic layers 14 used in inner layer portion 18.

Similarly, second main surface-side outer layer portion 20b includes a plurality of ceramic layers 14 located on the second main surface 12b side and located between second main surface 12b and the outermost surface of inner layer portion 18 on the second main surface 12b side and a straight line extending in the direction along this outermost surface, and a plurality of first auxiliary electrode layers $29a_1$, a plurality of second auxiliary electrode layers $29a_2$ (FIG. 11), a plurality of third auxiliary electrode layers $29b_1$, and a plurality of fourth auxiliary electrode layers $29b_2$ (FIG. 12) that are disposed on the plurality of ceramic layers 14. Second main surface-side outer layer portion 20b includes the plurality of ceramic layers 14 located between second main surface 12b and internal electrode layer 16 closest to second main surface 12b, and the plurality of first auxiliary electrode layers $29a_1$, the plurality of second auxiliary electrode layers $29a_2$, the plurality of third auxiliary electrode layers $29b_1$, and the plurality of fourth auxiliary electrode layers $29b_2$ that are disposed on the plurality of ceramic layers 14. Ceramic layers 14 used in second main surface-side outer layer portion 20b may be the same or substantially the same as ceramic layers 14 used in inner layer portion 18.

Further, multilayer body 12 includes a first side surface-side outer layer portion 22a including a plurality of ceramic layers 14 located on the first side surface 12c side and located between first side surface 12c and the outermost surface of inner layer portion 18 on the first side surface 12c side, and a plurality of third auxiliary electrode layers $29b_1$ (FIG. 13) disposed on the plurality of ceramic layers 14.

Similarly, multilayer body 12 includes a second side surface-side outer layer portion 22b including a plurality of ceramic layers 14 located on the second side surface 12d side and located between second side surface 12d and the outermost surface of inner layer portion 18 on the second side surface 12d side, and a plurality of fourth auxiliary electrode layers $29b_2$ (FIG. 13) disposed on the plurality of ceramic layers 14.

First side surface-side outer layer portion 22a and second side surface-side outer layer portion 22b are each also referred to as a W gap or a side gap.

Further, multilayer body 12 includes a first end surface-side outer layer portion 24a including a plurality of ceramic layers 14 located on the first end surface 12e side and located between first end surface 12e and the outermost surface of inner layer portion 18 on the first end surface 12e side, and a plurality of first auxiliary electrode layers $29a_1$ (FIG. 14) disposed on the plurality of ceramic layers 14.

Similarly, multilayer body 12 includes a second end surface-side outer layer portion 24b including a plurality of ceramic layers 14 located on the second end surface 12f side and located between second end surface 12f and the outermost surface of inner layer portion 18 on the second end surface 12f side, and a plurality of second auxiliary electrode layers $29a_2$ (FIG. 14) disposed on the plurality of ceramic layers 14.

Further, first end surface-side outer layer portion 24a and second end surface-side outer layer portion 24b are each also referred to as an L gap or an end gap.

The dimensions of multilayer body 12 are not particularly limited, but are preferably set, for example, such that dimension L in length direction z is about 0.18 mm or more and about 9.95 mm or less, dimension W in width direction y is about 0.08 mm or more and about 9.95 mm or less, and dimension T in height direction x is about 0.08 mm or more and about 4.95 mm or less.

Ceramic layer 14 can be made, for example, of a dielectric material. Examples of such a ceramic material usable herein may be a dielectric ceramic containing a component such as $BaTiO_3$, $CaTiO_3$, $SrTiO_3$, or $CaZrO_3$. In the case where the ceramic material is included as a main component, for example, a material such as an Mn compound, an Fe compound, a Cr compound, a Co compound, or an Ni compound that is obtained by adding a subcomponent smaller in content than the main component may be used depending on the desired characteristics of multilayer body 12.

When ceramic layers 14 are made using different materials, the multilayer ceramic electronic component defines and functions as a piezoelectric component, a thermistor, an inductor, and the like as in the first preferred embodiment.

The thickness of the fired ceramic layer 14 is preferably, for example, about 0.3 μm or more and about 3.0 μm or less. The number of stacked ceramic layers 14 is preferably, for example, about 15 or more and about 1200 or less. The number of ceramic layers 14 is equal to a sum of the number of ceramic layers 14 in inner layer portion 18, and the number of ceramic layers 14 in first main surface-side outer layer portion 20a and second main surface-side outer layer portion 20b.

As described above, multilayer body 12 includes a plurality of first internal electrode layers 16a and a plurality of second internal electrode layers 16b as the plurality of internal electrode layers 16.

As shown in FIG. 13, first internal electrode layer 16a includes a first facing electrode portion 26a facing second internal electrode layer 16b, a first extending electrode portion $28a_1$ extending from first facing electrode portion 26a to first end surface 12e, first side surface 12c, and second side surface 12d of multilayer body 12, and a second extending electrode portion $28a_2$ extending from first facing electrode portion 26a to second end surface 12f, first side surface 12c, and second side surface 12d of multilayer body 12. Specifically, as shown in FIG. 13, except for the end portions connected to first extending electrode portion $28a_1$ and second extending electrode portion $28a_2$, first facing electrode portion 26a is not exposed from multilayer body 12 in plan view. First extending electrode portion $28a_1$ is exposed at first end surface 12e, first side surface 12c, and second side surface 12d of multilayer body 12, while second extending electrode portion $28a_2$ is exposed at second end surface 12f, first side surface 12c, and second side surface 12d of multilayer body 12.

The shapes of first facing electrode portion 26a, first extending electrode portion $28a_1$, and second extending electrode portion $28a_2$ are not particularly limited, but are preferably rectangular or substantially rectangular. In addition, each of their corners may be rounded.

As shown in FIG. 14, second internal electrode layer 16b has a cross shape or substantially cross shape and includes a second facing electrode portion 26b facing first internal electrode layer 16a, a third extending electrode portion $28b_1$ extending from second facing electrode portion 26b to first side surface 12c of multilayer body 12, and a fourth extending electrode portion $28b_2$ extending from second facing electrode portion 26b to second side surface 12d of multilayer body 12. Specifically, third extending electrode portion $28b_1$ is exposed at first side surface 12c of multilayer body 12, and fourth extending electrode portion $28b_2$ is exposed at second side surface 12d of multilayer body 12. Thus, second internal electrode layer 16b is not exposed at first end surface 12e and second end surface 12f of multilayer body 12.

The shapes of second facing electrode portion 26b, third extending electrode portion $28b_1$, and fourth extending electrode portion $28b_2$ are preferably rectangular or substantially rectangular. In addition, each of their corners may be rounded.

As shown in FIG. 14, the relationship A B is preferably established between a dimension A in length direction z and a dimension B in length direction z. Dimension A in length direction z connects the side of second facing electrode portion 26b on the first end surface 12e side, and the side of second facing electrode portion 26b on the second end surface 12f side. Dimension B in length direction z connects the side of each of third and fourth extending electrode portions $28b_1$ and $28b_2$ on the first end surface 12e side, and the side of each of third and fourth extending electrode portions $28b_1$ and $28b_2$ on the second end surface 12f side.

The shape of third extending electrode portion $28b_1$ may be tapered such that the width becomes narrower toward first side surface 12c, and the shape of fourth extending electrode portion $28b_2$ may be tapered such that the width becomes narrower toward second side surface 12d.

First internal electrode layers 16a and second internal electrode layers 16b may be alternately stacked with ceramic layers 14 respectively interposed therebetween, or a plurality of ceramic layers 14 including first internal electrode layers 16a respectively disposed thereon may be stacked, on which ceramic layer 14 having second internal electrode layer 16b disposed thereon may be stacked. In this way, the stacking pattern can be changed in accordance with the capacitance value desired to be achieved.

Multilayer body 12 includes a facing electrode portion 27 where first facing electrode portion 26a of first internal electrode layer 16a faces second facing electrode portion 26b of second internal electrode layer 16b. Facing electrode portion 27 is provided as a portion of inner layer portion 18. Facing electrode portion 27 is also referred to as a capacitor effective portion.

First internal electrode layer 16a and second internal electrode layer 16b can be made of an appropriate electrically conductive material, for example, metal such as Ni, Cu, Ag, Pd, or Au, or an alloy including at least one of these metals such as an Ag—Pd alloy.

The number of first internal electrode layers 16a and second internal electrode layers 16b is not particularly limited, but the total number of first internal electrode layers 16a and second internal electrode layers 16b is preferably, for example, 10 or more and 1000 or less. The number of first internal electrode layers 16a and the number of second internal electrode layers 16b each are not particularly limited, but each are preferably, for example, 5 or more and 500 or less.

The thickness of first internal electrode layer 16a is preferably about 0.2 μm or more and about 3.0 μm or less, for example.

The thickness of second internal electrode layer 16b is preferably about 0.2 μm or more and about 3.0 μm or less, for example.

Multilayer body 12 includes first auxiliary electrode layer $29a_1$, second auxiliary electrode layer $29a_2$, third auxiliary electrode layer $29b_1$, and fourth auxiliary electrode layer $29b_2$ as a plurality of auxiliary electrode layers.

As shown in FIG. 14, first auxiliary electrode layer $29a_1$ is disposed on ceramic layer 14 on the first end surface 12e side.

As shown in FIGS. 11 and 14, first auxiliary electrode layer $29a_1$ of first end surface-side outer layer portion 24a is disposed to be coplanar with ceramic layer 14 on which second internal electrode layer 16b is disposed, to be spaced apart from second internal electrode layer 16b, and to be exposed at first end surface 12e, first side surface 12c, and second side surface 12d. In first end surface-side outer layer portion 24a, first auxiliary electrode layer $29a_1$ faces first extending electrode portion $28a_1$ of first internal electrode layer 16a with ceramic layer 14 interposed therebetween. First auxiliary electrode layer $29a_1$ of first end surface-side outer layer portion 24a has, for example, a C-shape in plan view (FIG. 14) without limitation.

As shown in FIG. 15, first auxiliary electrode layer $29a_1$ in each of first main surface-side outer layer portion 20a and second main surface-side outer layer portion 20b is disposed, for example, in a rectangular or substantially rectangular shape in plan view on ceramic layer 14 on the first end surface 12e side, and is exposed at first end surface 12e, first side surface 12c, and second side surface 12d (FIG. 15). Referring to FIGS. 11 and 15, first auxiliary electrode layer $29a_1$ on first main surface 12a of first main surface-side outer layer portion 20a is exposed at first main surface 12a, first end surface 12e, first side surface 12c, and second side surface 12d. Referring to FIGS. 11 and 15, first auxiliary electrode layer $29a_1$ on second main surface 12b of second main surface-side outer layer portion 20b is exposed at second main surface 12b, first end surface 12e, first side surface 12c, and second side surface 12d. First auxiliary electrode layer $29a_1$ may also not be provided in first main surface-side outer layer portion 20a and second main surface-side outer layer portion 20b.

As shown in FIG. 14, second auxiliary electrode layer $29a_2$ is disposed on ceramic layer 14 on the second end surface 12f side.

As shown in FIGS. 11 and 14, second auxiliary electrode layer $29a_2$ in second end surface-side outer layer portion 24b is coplanar with ceramic layer 14 on which second internal electrode layer 16b is disposed, to be spaced apart from second internal electrode layer 16b, and to be exposed at second end surface 12f, first side surface 12c, and second side surface 12d. In second end surface-side outer layer portion 24b, second auxiliary electrode layer $29a_2$ faces second extending electrode portion $28a_2$ of first internal electrode layer 16a with ceramic layer 14 interposed therebetween. Second auxiliary electrode layer $29a_2$ of second end surface-side outer layer portion 24b has, for example, a C-shape in plan view (FIG. 14) without limitation.

As shown in FIG. 15, second auxiliary electrode layer $29a_2$ in each of first main surface-side outer layer portion 20a and second main surface-side outer layer portion 20b has, for example, a rectangular or substantially rectangular shape in plan view on ceramic layer 14 on the second end surface 12f side, and is exposed at second end surface 12f, first side surface 12c, and second side surface 12d. Referring to FIGS. 11 and 15, second auxiliary electrode layer $29a_2$ on first main surface 12a of first main surface-side outer layer portion 20a is exposed at first main surface 12a, second end surface 12f, first side surface 12c, and second side surface 12d. Referring to FIGS. 11 and 15, second auxiliary electrode layer $29a_2$ on second main surface 12b of second main surface-side outer layer portion 20b is exposed at second main surface 12b, second end surface 12f, first side surface 12c, and second side surface 12d. Second auxiliary electrode layer $29a_2$ may also not be provided in first main surface-side outer layer portion 20a and second main surface-side outer layer portion 20b.

As shown in FIG. 13, third auxiliary electrode layer $29b_1$ is disposed on ceramic layer 14 on the first side surface 12c side.

As shown in FIGS. 12 and 13, third auxiliary electrode layer $29b_1$ of first side surface-side outer layer portion 22a is coplanar with ceramic layer 14 on which first internal electrode layer 16a is disposed, to be spaced apart from first internal electrode layer 16a, and to be exposed at first side surface 12c. In first side surface-side outer layer portion 22a, third auxiliary electrode layer $29b_1$ faces third extending electrode portion $28b_1$ of second internal electrode layer 16b with ceramic layer 14 interposed therebetween. Third auxiliary electrode layer $29b_1$ of first side surface-side outer layer portion 22a has, for example, a rectangular or substantially rectangular shape in plan view (FIG. 13) without limitation.

Third auxiliary electrode layer $29b_1$ in each of first main surface-side outer layer portion 20a and second main surface-side outer layer portion 20b is disposed on ceramic layer 14 on the first side surface 12c side. In this case, third auxiliary electrode layer $29b_1$ in each of first main surface-side outer layer portion 20a and second main surface-side outer layer portion 20b is rectangular or substantially rectangular in plan view that is larger in area than third auxiliary electrode layer $29b_1$ in first side surface-side outer layer portion 22a (FIGS. 13 and 15). Referring to FIGS. 12 and 15, third auxiliary electrode layer $29b_1$ on first main surface 12a of first main surface-side outer layer portion 20a is exposed at first main surface 12a and first side surface 12c. Referring to FIGS. 12 and 15, third auxiliary electrode layer $29b_1$ on second main surface 12b of second main surface-side outer layer portion 20b is exposed at second main surface 12b and first side surface 12c. Third auxiliary electrode layer $29b_1$ may also not be provided in first main surface-side outer layer portion 20a and second main surface-side outer layer portion 20b.

As shown in FIG. 13, fourth auxiliary electrode layer $29b_2$ is disposed on ceramic layer 14 on the second side surface 12d side.

As shown in FIGS. 12 and 13, fourth auxiliary electrode layer $29b_2$ of second side surface-side outer layer portion 22b is coplanar with ceramic layer 14 on which first internal electrode layer 16a is disposed, to be spaced apart from first internal electrode layer 16a, and to be exposed at second side surface 12d. In second side surface-side outer layer portion 22b, fourth auxiliary electrode layer $29b_2$ faces fourth extending electrode portion $28b_2$ of second internal electrode layer $16b$ with ceramic layer 14 interposed therebetween. Fourth auxiliary electrode layer $29b_2$ of second side surface-side outer layer portion $22b$ has, for example, a rectangular or substantially rectangular shape in plan view (FIG. 13) without limitation.

Fourth auxiliary electrode layer $29b_2$ in each of first main surface-side outer layer portion $20a$ and second main surface-side outer layer portion $20b$ is disposed on ceramic layer 14 on the second side surface $12d$ side. In this case, fourth auxiliary electrode layer $29b_2$ in each of first main surface-side outer layer portion $20a$ and second main surface-side outer layer portion $20b$ is rectangular or substantially rectangular in plan view that is larger in area than fourth auxiliary electrode layer $29b_2$ in second side surface-side outer layer portion $22b$ (FIGS. 13 and 15). Referring to FIGS. 12 and 15, fourth auxiliary electrode layer $29b_2$ on first main surface $12a$ of first main surface-side outer layer portion $20a$ is exposed at first main surface $12a$ and second side surface $12d$. Referring to FIGS. 12 and 15, fourth auxiliary electrode layer $29b_2$ on second main surface $12b$ of second main surface-side outer layer portion $20b$ is exposed at second main surface $12b$ and second side surface $12d$. Fourth auxiliary electrode layer $29b_2$ may also not be provided in first main surface-side outer layer portion $20a$ and second main surface-side outer layer portion $20b$.

By providing first auxiliary electrode layer $29a_1$ as described above, first Cu plating layer $34a$ (described later) is readily formed on first end surface $12e$, first side surface $12c$, and second side surface $12d$. In other words, not only first extending electrode portion $28a_1$ of first internal electrode layer $16a$, but also first auxiliary electrode layer $29a_1$ is exposed at first end surface $12e$, first side surface $12c$, and second side surface $12d$. Thus, first Cu plating layer $34a$ is readily formed by a plating treatment over first end surface $12e$, first side surface $12c$, and second side surface $12d$. Further, in the present preferred embodiment, first auxiliary electrode layer $29a_1$ exposed at first main surface $12a$ and first auxiliary electrode layer $29a_1$ exposed at second main surface $12b$ are provided, and thus, first Cu plating layer $34a$ is readily formed by a plating treatment on first main surface $12a$ and second main surface $12b$.

First auxiliary electrode layer $29a_1$ may be exposed only at first end surface $12e$. Further, first extending electrode portion $28a_1$ may also be exposed only at first end surface $12e$. In this case, not only first extending electrode portion $28a_1$ but also first auxiliary electrode layer $29a_1$ is exposed at first end surface $12e$. Therefore, first Cu plating layer $34a$ is readily formed by a plating treatment only on first end surface $12e$.

Further, when first Cu plating layer $34a$ extends from first end surface $12e$ to reach first main surface $12a$ and second main surface $12b$, first auxiliary electrode layer $29a_1$ may be exposed only at first main surface $12a$ and second main surface $12b$. In other words, first auxiliary electrode layer $29a_1$ exposed at first main surface $12a$ should only be provided in first main surface-side outer layer portion $20a$ while first auxiliary electrode layer $29a_1$ exposed at second main surface $12b$ should only be provided in second main surface-side outer layer portion $20b$.

Further, first auxiliary electrode layer $29a_1$ is not exposed at first side surface $12c$ and second side surface $12d$, but may be exposed only at first end surface $12e$, first main surface $12a$, and second main surface $12b$. In this case, first Cu plating layer $34a$ extending from first end surface $12e$ to reach first main surface $12a$ and second main surface $12b$ is readily provided.

Similarly, not only second extending electrode portion $28a_2$ of first internal electrode layer $16a$ but also second auxiliary electrode layer $29a_2$ is exposed at second end surface $12f$, first side surface $12c$, and second side surface $12d$. Thus, second Cu plating layer $34b$ is readily formed by a plating treatment over second end surface $12f$, first side surface $12c$, and second side surface $12d$. Further, in the present preferred embodiment, second auxiliary electrode layer $29a_2$ exposed at first main surface $12a$ and second auxiliary electrode layer $29a_2$ exposed at second main surface $12b$ are provided, and thus, second Cu plating layer $34b$ is readily formed by a plating treatment on first main surface $12a$ and second main surface $12b$.

Second auxiliary electrode layer $29a_2$ may be exposed only at second end surface $12f$. Further, second extending electrode portion $28a_2$ may also be exposed only at second end surface $12f$. In this case, in second end surface $12f$, not only second extending electrode portion $28a_2$ but also second auxiliary electrode layer $29a_2$ is exposed. Thus, second Cu plating layer $34b$ is readily formed by a plating treatment only on second end surface $12f$.

Further, when second Cu plating layer $34b$ extends from second end surface $12f$ to reach first main surface $12a$ and second main surface $12b$, second auxiliary electrode layer $29a_2$ may be exposed only at first main surface $12a$ and second main surface $12b$. In other words, second auxiliary electrode layer $29a_2$ exposed at first main surface $12a$ should only be provided in first main surface-side outer layer portion $20a$ while second auxiliary electrode layer $29a_2$ exposed at second main surface $12b$ should only be provided in second main surface-side outer layer portion $20b$.

Further, second auxiliary electrode layer $29a_2$ is not exposed at first side surface $12c$ and second side surface $12d$, but may be exposed only at second end surface $12f$, first main surface $12a$, and second main surface $12b$. In this case, second Cu plating layer $34b$ is readily provided to extend from second end surface $12f$ to reach first main surface $12a$ and second main surface $12b$.

Similarly, not only third extending electrode portion $28b_1$ of second internal electrode layer $16b$ but also third auxiliary electrode layer $29b_1$ is exposed at first side surface $12c$. Thus, fifth Cu plating layer $34c$ is readily formed by a plating treatment over first side surface $12c$. Further, in the present preferred embodiment, since third auxiliary electrode layer $29b_1$ exposed at first main surface $12a$ and second main surface $12b$ is provided, fifth Cu plating layer $34c$ is readily formed by a plating treatment on first main surface $12a$ and second main surface $12b$.

Third auxiliary electrode layer $29b_1$ may be exposed only at first side surface $12c$. In this case, fifth Cu plating layer $34c$ is readily formed by a plating treatment on first side surface $12c$.

Further, when fifth Cu plating layer $34c$ extends from first side surface $12c$ to reach first main surface $12a$ and second main surface $12b$, third auxiliary electrode layer $29b_1$ may be exposed only at first main surface $12a$ and second main surface $12b$. In other words, third auxiliary electrode layer $29b_1$ exposed at first main surface $12a$ should only be provided in first main surface-side outer layer portion $20a$ while third auxiliary electrode layer $29b_1$ exposed at second main surface $12b$ should only be provided in second main surface-side outer layer portion $20b$.

Similarly, not only fourth extending electrode portion $28b_2$ of second internal electrode layer $16b$ but also fourth auxiliary electrode layer $29b_2$ is exposed at second side surface $12d$. Thus, sixth Cu plating layer $34d$ is readily formed by a plating treatment over second side surface $12d$.

Further, in the present preferred embodiment, since fourth auxiliary electrode layer $29b_2$ exposed at first main surface $12a$ and second main surface $12b$ is provided, sixth Cu plating layer $34d$ is readily formed by a plating treatment on first main surface $12a$ and second main surface $12b$.

Fourth auxiliary electrode layer $29b_2$ may be exposed only at second side surface $12d$. In this case, sixth Cu plating layer $34d$ is readily formed by a plating treatment on second side surface $12d$.

Further, when sixth Cu plating layer $34d$ extends from second side surface $12d$ to reach first main surface $12a$ and second main surface $12b$, fourth auxiliary electrode layer $29b_2$ may be exposed only at first main surface $12a$ and second main surface $12b$. In other words, fourth auxiliary electrode layer $29b_2$ exposed at first main surface $12a$ should only be provided in first main surface-side outer layer portion $20a$ while fourth auxiliary electrode layer $29b_2$ exposed at second main surface $12b$ should only be provided in second main surface-side outer layer portion $20b$.

Further, by providing auxiliary electrode layers $29a_1$, $29a_2$, $29b_1$ and $29b_2$, the metal ratio enabling higher toughness than that of ceramic layer 14 of multilayer body 12 can be increased in three-terminal multilayer ceramic capacitor 100. As a result, the mechanical strength of three-terminal multilayer ceramic capacitor 100 can be improved, so that occurrence of cracks and fractures in three-terminal multilayer ceramic capacitor 100 can be reduced or prevented.

For example, similar to internal electrode layer 16, auxiliary electrode layers $29a_1$, $29a_2$, $29b_1$ and $29b_2$ each may be made of an appropriate electrically conductive material, for example, metal such as Ni, Cu, Ag, Pd, or Au, or an alloy including at least one of these metals such as an Ag—Pd alloy.

The thickness of each of auxiliary electrode layers $29a_1$, $29a_2$, $29b_1$, and $29b_2$ is preferably about 0.2 μm or more and 3.0 μm or less, for example.

Dimension L of the distance in length direction z between second internal electrode layer $16b$ and each of first and second auxiliary electrode layers $29a_1$ and $29a_2$ is preferably, for example, about 0.04 mm or more. Further, dimension L of the distance in width direction y between first internal electrode layer $16a$ and each of third and fourth auxiliary electrode layers $29b_1$ and $29b_2$ is preferably, for example, about 0.04 mm or more.

External electrode 30 is disposed on each of the first end surface $12e$ side, the second end surface $12f$ side, the first side surface $12c$ side, and the second side surface $12d$ side of multilayer body 12. External electrode 30 includes a first external electrode $30a$, a second external electrode $30b$, a third external electrode $30c$, and a fourth external electrode $30d$.

First external electrode $30a$ is disposed on first end surface $12e$ of multilayer body 12. First external electrode $30a$ extends from first end surface $12e$ of multilayer body 12 so as to cover a portion of each of first main surface $12a$, second main surface $12b$, first side surface $12c$, and second side surface $12d$. Further, first external electrode $30a$ is electrically connected to first extending electrode portion $28a_1$ of first internal electrode layer $16a$ and first auxiliary electrode layer $29a_1$ that are exposed at first end surface $12e$ of multilayer body 12. First external electrode $30a$ may be disposed only on first end surface $12e$ of multilayer body 12.

Second external electrode $30b$ is disposed on second end surface $12f$ of multilayer body 12. Second external electrode $30b$ extends from second end surface $12f$ of multilayer body 12 so as to cover a portion of each of first main surface $12a$, second main surface $12b$, first side surface $12c$, and second side surface $12d$. Further, second external electrode $30b$ is electrically connected to second extending electrode portion $28a_2$ of first internal electrode layer $16a$ and second auxiliary electrode layer $29a_2$ that are exposed at second end surface $12f$ of multilayer body 12. Second external electrode $30b$ may be disposed only on second end surface $12f$ of multilayer body 12.

Third external electrode $30c$ is disposed on first side surface $12c$ of multilayer body 12. Third external electrode $30c$ extends from first side surface $12c$ so as to cover a portion of each of first main surface $12a$ and second main surface $12b$. Third external electrode $30c$ is electrically connected to third extending electrode portion $28b_1$ of second internal electrode layer $16b$ and third auxiliary electrode layer $29b_1$ that are exposed at first side surface $12c$ of multilayer body 12.

Fourth external electrode $30d$ is disposed on second side surface $12d$ of multilayer body 12. Fourth external electrode $30d$ extends from second side surface $12d$ so as to cover a portion of each of first main surface $12a$ and second main surface $12b$. Fourth external electrode $30d$ is electrically connected to fourth extending electrode portion $28b_2$ of second internal electrode layer $16b$ and fourth auxiliary electrode layer $29b_2$ that are exposed at second side surface $12d$ of multilayer body 12.

Specifically, external electrode 30 is formed of a plating layer. In the present preferred embodiment, external electrode 30 includes a lower Cu plating layer 34, an upper Cu plating layer 35, and an outer plating layer 36. Outer plating layer 36 may not be provided.

First external electrode $30a$ includes a first Cu plating layer $34a$, a third Cu plating layer $35a$ disposed on first Cu plating layer $34a$, and a first outer plating layer $36a$ disposed on third Cu plating layer $35a$. First external electrode $30a$ includes no underlying electrode layer, and first Cu plating layer $34a$ is provided directly on multilayer body 12.

Second external electrode $30b$ includes a second Cu plating layer $34b$, a fourth Cu plating layer $35b$ disposed on second Cu plating layer $34b$, and a second outer plating layer $36b$ disposed on fourth Cu plating layer $35b$. Second external electrode $30b$ includes no underlying electrode layer, and second Cu plating layer $34b$ is provided directly on multilayer body 12.

Third external electrode $30c$ includes a fifth Cu plating layer $34c$, a seventh Cu plating layer $35c$ disposed on fifth Cu plating layer $34c$, and a third outer plating layer $36c$ disposed on seventh Cu plating layer $35c$. Third external electrode $30c$ includes no underlying electrode layer, and fifth Cu plating layer $34c$ is provided directly on multilayer body 12.

Fourth external electrode $30d$ includes a sixth Cu plating layer $34d$, an eighth Cu plating layer $35d$ disposed on sixth Cu plating layer $34d$, and a fourth outer plating layer $36d$ disposed on eighth Cu plating layer $35d$. Fourth external electrode $30d$ includes no underlying electrode layer, and sixth Cu plating layer $34d$ is provided directly on multilayer body 12.

(2-1) First Cu Plating Layer and Second Cu Plating Layer

First Cu plating layer $34a$ is disposed on first end surface $12e$ of multilayer body 12 and extends from first end surface $12e$ so as to cover a portion of first main surface $12a$, a portion of second main surface $12b$, a portion of first side surface $12c$, and a portion of second side surface $12d$. In this case, first Cu plating layer $34a$ is electrically connected to first extending electrode portion $28a_1$ of first internal electrode layer $16a$ and first auxiliary electrode layer $29a_1$.

Second Cu plating layer 34b is disposed on second end surface 12f of multilayer body 12 and extends from second end surface 12f so as to cover a portion of first main surface 12a, a portion of second main surface 12b, a portion of first side surface 12c, and a portion of second side surface 12d. In this case, second Cu plating layer 34b is electrically connected to second extending electrode portion 28a$_2$ of first internal electrode layer 16a and second auxiliary electrode layer 29a$_2$.

First Cu plating layer 34a may be disposed only on first end surface 12e of multilayer body 12, and second Cu plating layer 34b may be disposed only on second end surface 12f of multilayer body 12.

The average number of Cu particles is, for example, about 1.5 or less in any two or more first square regions 40a (FIG. 16) of first Cu plating layer 34a on the first end surface 12e side and is about 1.5 or less in any two or more second square regions 40b (FIG. 16) of second Cu plating layer 34b on the second end surface 12f side. Each of first square regions 40a and second square regions 40b has a square or substantially square shape with each side having a length of about 2 μm, for example.

The average number of Cu particles in first square regions 40a and the average number of Cu particles in second square regions 40b each are calculated by the same method as that in the first preferred embodiment.

The average number of Cu particles is, for example, about 1.5 or less in first square regions 40a of first Cu plating layer 34a and the average number of Cu particles is, for example, about 1.5 or less in second square regions 40b of second Cu plating layer 34b. Thus, the area of adhesion between first Cu plating layer 34a and first internal electrode layer 16a increases while the area of adhesion between second Cu plating layer 34b and first internal electrode layer 16a increases. Thus, the adhesive strength between first Cu plating layer 34a and first internal electrode layer 16a can be improved while the adhesive strength between second Cu plating layer 34b and first internal electrode layer 16a can be improved. As a result, the adhesive strength between first external electrode 30a including first Cu plating layer 34a and first internal electrode layer 16a can be improved while the adhesive strength between second external electrode 30b including second Cu plating layer 34b and first internal electrode layer 16a can be improved. Further, the ESR in the region including each of these adhesion portions can be reduced.

The Cu content in each of first Cu plating layer 34a and second Cu plating layer 34b is preferably, for example, about 60% or more. When the Cu content is about 60% or more, Cu is sufficiently diffused from first Cu plating layer 34a and second Cu plating layer 34b to first internal electrode layer 16a. Thus, the adhesive strength between first Cu plating layer 34a and first internal electrode layer 16a can be improved while the adhesive strength between second Cu plating layer 34b and first internal electrode layer 16a can be improved.

The method of calculating the Cu content in each of first Cu plating layer 34a and second Cu plating layer 34b is as described in the first preferred embodiment.

In this case, first Cu plating layer 34a includes a region that is adjacent to first end surface 12e and where Ni is diffused, and this region in first Cu plating layer 34a is referred to as a first Ni diffusion region. The first Ni diffusion region preferably has a length of, for example, about ⅖ or less of the first length (described later) in length direction z. Further, second Cu plating layer 34b includes a region that is adjacent to second end surface 12f and where Ni is diffused, and this region in second Cu plating layer 34b is referred to as a second Ni diffusion region. The second Ni diffusion region preferably has a length of, for example, about ⅖ or less of the second length (described later) in length direction z.

This makes it possible to increase the Cu content in the vicinity of the interface between first Cu plating layer 34a and third Cu plating layer 35a, and the interface between second Cu plating layer 34b and fourth Cu plating layer 35b. Thus, the adhesive strength between first Cu plating layer 34a and third Cu plating layer 35a can be improved while the adhesive strength between second Cu plating layer 34b and fourth Cu plating layer 35b can be improved.

The thickness of each of first Cu plating layer 34a and second Cu plating layer 34b is about 2 μm or more and about 15 μm or less, for example.

Each of first Cu plating layer 34a and second Cu plating layer 34b preferably includes no glass component.

The metal ratio per unit area in each of first Cu plating layer 34a and second Cu plating layer 34b is preferably, for example, about 99% by volume.

(2-2) Third Cu Plating Layer and Fourth Cu Plating Layer

Third Cu plating layer 35a is disposed on first Cu plating layer 34a so as to cover first Cu plating layer 34a. Fourth Cu plating layer 35b is disposed on second Cu plating layer 34b so as to cover second Cu plating layer 34b.

The average number of Cu particles is, for example, more than about 1.5 in any two or more third square regions 41a of third Cu plating layer 35a on the first end surface 12e side and is more than about 1.5 in any two or more fourth square regions 41b of fourth Cu plating layer 35b on the second end surface 12f side. Each of third square regions 41a and fourth square regions 41b has a square or substantially square shape with each side having a length of about 2 μm, for example.

The average number of Cu particles in third square regions 41a and the average number of Cu particles in fourth square regions 41b each are calculated by the same method as that for first square regions 40a.

Since, for example, the number of Cu particles is more than about 1.5 in third square regions 41a of third Cu plating layer 35a and is more than about 1.5 in fourth square regions 41b of fourth Cu plating layer 35b, the mechanical strength of third Cu plating layer 35a and fourth Cu plating layer 35b can be improved. Therefore, the mechanical strength of first external electrode 30a including third Cu plating layer 35a can be improved while the mechanical strength of second external electrode 30b including fourth Cu plating layer 35b can be improved.

In this way, the number of Cu particles in each of first Cu plating layer 34a and second Cu plating layer 34b is reduced, whereas third Cu plating layer 35a has a larger number of Cu particles than first Cu plating layer 34a while fourth Cu plating layer 35b has a larger in number of Cu particles than second Cu plating layer 34b. Thus, entirely in first external electrode 30a and second external electrode 30b, the strength of adhesion to first internal electrode layer 16a can be improved, the ESR can be reduced, and also the mechanical strength can be improved.

The Cu content in each of third Cu plating layer 35a and fourth Cu plating layer 35b is preferably, for example, about 95% or more. When the Cu content in each of third Cu plating layer 35a and fourth Cu plating layer 35b is about 95% or more, the adhesive strength between first Cu plating layer 34a and third Cu plating layer 35a is improved while the adhesive strength between second Cu plating layer 34b and fourth Cu plating layer 35b is improved. Thus, peeling-off of third Cu plating layer 35a from first Cu plating layer 34a can be reduced or prevented, peeling-off of fourth Cu plating layer 35b from second Cu plating layer 34b can be reduced or prevented, and also, an increase in insulation resistance of first external electrode 30a and second external electrode 30b can be reduced or prevented.

The thickness of each of third Cu plating layer 35a and fourth Cu plating layer 35b is about 2 μm or more and about 15 μm or less, for example.

Each of third Cu plating layer 35a and fourth Cu plating layer 35b preferably includes no glass component.

The metal ratio per unit area in each of third Cu plating layer 35a and fourth Cu plating layer 35b is preferably, for example, about 99% by volume.

(2-3) First Outer Plating Layer and Second Outer Plating Layer

First outer plating layer 36a is disposed on third Cu plating layer 35a. Second outer plating layer 36b is disposed on fourth Cu plating layer 35b. The configurations of first outer plating layer 36a and second outer plating layer 36b are the same as those in the first preferred embodiment.

(2-4) Fifth Cu Plating Layer and Sixth Cu Plating Layer

Fifth Cu plating layer 34c is disposed on first side surface 12c of multilayer body 12 and extends from first side surface 12c so as to cover a portion of first main surface 12a and a portion of second main surface 12b. In this case, fifth Cu plating layer 34c is electrically connected to third extending electrode portion $28b_1$ of second internal electrode layer 16b and third auxiliary electrode layer $29b_1$.

Sixth Cu plating layer 34d is disposed on second side surface 12d of multilayer body 12 and extends from second side surface 12d so as to cover a portion of first main surface 12a and a portion of second main surface 12b. In this case, sixth Cu plating layer 34d is electrically connected to fourth extending electrode portion $28b_2$ of second internal electrode layer 16b and fourth auxiliary electrode layer $29b_2$.

By providing first, second, third, and fourth extending electrode portions $28a_1$, $28a_2$, $28b_1$, and $28b_2$ as described above, low ESL (equivalent series inductance) can be achieved.

Fifth Cu plating layer 34c may be disposed only on first side surface 12c of multilayer body 12, and sixth Cu plating layer 34d may be disposed only on second side surface 12d of multilayer body 12.

The average number of Cu particles is, for example, about 1.5 or less in any two or more fifth square regions 40c (FIG. 16) of fifth Cu plating layer 34c on the first side surface 12c side and is about 1.5 or less in any two or more sixth square regions 40d (FIG. 16) of sixth Cu plating layer 34d on the second side surface 12d side. Each of fifth square regions 40c and sixth square regions 40d has a square or substantially square shape with each side having a length of about 2 μm, for example.

Since the average number of Cu particles in fifth square regions 40c and the average number of Cu particles in sixth square regions 40d are calculated by the same method as that in the first preferred embodiment, the description thereof will not be repeated.

The average number of Cu particles is about 1.5 or less in fifth square regions 40c of fifth Cu plating layer 34c and is about 1.5 or less in sixth square regions 40d of sixth Cu plating layer 34d. Thus, the area of adhesion between fifth Cu plating layer 34c and second internal electrode layer 16b increases while the area of adhesion between sixth Cu plating layer 34d and second internal electrode layer 16b increases. Thus, the adhesive strength between fifth Cu plating layer 34c and second internal electrode layer 16b can be improved while the adhesive strength between sixth Cu plating layer 34d and second internal electrode layer 16b can be improved. As a result, the adhesive strength between third external electrode 30c including fifth Cu plating layer 34c and second internal electrode layer 16b can be improved while the adhesive strength between fourth external electrode 30d including sixth Cu plating layer 34d and second internal electrode layer 16b can be improved. Further, the ESR in the region including each of these adhesion portions can be reduced.

The Cu content in each of fifth Cu plating layer 34c and sixth Cu plating layer 34d is preferably, for example, about 60% or more. When the Cu content is about 60% or more, Cu is sufficiently diffused from fifth Cu plating layer 34c and sixth Cu plating layer 34d to second internal electrode layer 16b. Thus, the adhesive strength between fifth Cu plating layer 34c and second internal electrode layer 16b can be improved while the adhesive strength between sixth Cu plating layer 34d and second internal electrode layer 16b can be improved.

Since the Cu content in each of fifth Cu plating layer 34c and sixth Cu plating layer 34d is calculated by the same method as described in the first preferred embodiment, the description thereof will not be repeated.

In this case, fifth Cu plating layer 34c includes a region that is adjacent to first side surface 12c and where Ni is diffused, and this region in fifth Cu plating layer 34c is referred to as a fifth Ni diffusion region. The fifth Ni diffusion region preferably has a length of, for example, about ⅔ or less of the fifth length (described later) in width direction y. Further, sixth Cu plating layer 34d has a region that is adjacent to second side surface 12d and where Ni is diffused, and this region in sixth Cu plating layer 34d is referred to as a sixth Ni diffusion region. The sixth Ni diffusion region preferably has a length of, for example, about ⅔ or less of the sixth length (described later) in width direction y.

This makes it possible to increase the Cu content in the vicinity of the interface between fifth Cu plating layer 34c and seventh Cu plating layer 35c, and the interface between sixth Cu plating layer 34d and eighth Cu plating layer 35d. Thus, the adhesive strength between fifth Cu plating layer 34c and seventh Cu plating layer 35c can be improved while the adhesive strength between sixth Cu plating layer 34d and eighth Cu plating layer 35d can be improved.

The thickness of each of fifth Cu plating layer 34c and sixth Cu plating layer 34d is about 2 μm or more and about 15 μm or less, for example.

Each of fifth Cu plating layer 34c and sixth Cu plating layer 34d preferably includes no glass component.

The metal ratio per unit area in each of fifth Cu plating layer 34c and sixth Cu plating layer 34d is preferably, for example, about 99% by volume.

(2-5) Seventh Cu Plating Layer and Eighth Cu Plating Layer

Seventh Cu plating layer 35c is disposed on fifth Cu plating layer 34c so as to cover fifth Cu plating layer 34c. Eighth Cu plating layer 35d is disposed on sixth Cu plating layer 34d so as to cover sixth Cu plating layer 34d.

The average number of Cu particles, for example, is more than about 1.5 in any two or more seventh square regions 41c of seventh Cu plating layer 35c on the first side surface 12c side and is more than about 1.5 in any two or more eighth square regions 41d of eighth Cu plating layer 35d on the second side surface 12d side. Each of seventh square regions 41c and eighth square regions 41d has a square or substantially square shape with each side having a length of about 2 μm, for example.

The average number of Cu particles in seventh square regions 41c and the average number of Cu particles in eighth square regions 41d each are calculated by the same method as that for first square regions 40a.

Since the number of Cu particles is more than about 1.5 in seventh square regions 41c of seventh Cu plating layer 35c and is more than about 1.5 in eighth square regions 41d of eighth Cu plating layer 35d, the mechanical strength of seventh Cu plating layer 35c and eighth Cu plating layer 35d can be improved. Therefore, the mechanical strength of third external electrode 30c including seventh Cu plating layer 35c can be improved while the mechanical strength of fourth external electrode 30d including eighth Cu plating layer 35d can be improved.

In this way, the number of Cu particles in each of seventh Cu plating layer 35c and eighth Cu plating layer 35d is reduced, whereas seventh Cu plating layer 35c has a larger number of Cu particles than fifth Cu plating layer 34c while eighth Cu plating layer 35d has a larger number of Cu particles than sixth Cu plating layer 34d. Thus, entirely in third external electrode 30c and fourth external electrode 30d, the strength of adhesion to second internal electrode layer 16b can be improved, the ESR can be reduced, and also the mechanical strength is improved.

The Cu content in each of seventh Cu plating layer 35c and eighth Cu plating layer 35d is preferably, for example, about 95% or more. When the Cu content in each of seventh Cu plating layer 35c and eighth Cu plating layer 35d is about 95% or more, the adhesive strength between fifth Cu plating layer 34c and seventh Cu plating layer 35c is improved while the adhesive strength between sixth Cu plating layer 34d and eighth Cu plating layer 35d is improved. Thus, peeling-off of seventh Cu plating layer 35c from fifth Cu plating layer 34c can be reduced or prevented, peeling-off of eighth Cu plating layer 35d from sixth Cu plating layer 34d can be reduced or prevented, and also, an increase in insulation resistance of third external electrode 30c and fourth external electrode 30d can be reduced or prevented.

The thickness of each of seventh Cu plating layer 35c and eighth Cu plating layer 35d is about 2 μm or more and about 15 μm or less, for example.

Each of seventh Cu plating layer 35c and eighth Cu plating layer 35d preferably includes no glass component.

The metal ratio per unit area in each of seventh Cu plating layer 35c and eighth Cu plating layer 35d is preferably, for example, about 99% by volume.

(2-6) Third Outer Plating Layer and Fourth Outer Plating Layer

Third outer plating layer 36c is disposed on seventh Cu plating layer 35c. Fourth outer plating layer 36d is disposed on eighth Cu plating layer 35d. The configurations of third outer plating layer 36c and eighth Cu plating layer 35d are the same as those in the first preferred embodiment.

(3) Dimensions of Three-Terminal Multilayer Ceramic Capacitor

Herein, a dimension L indicates the dimension in length direction z of three-terminal multilayer ceramic capacitor 100 including multilayer body 12 and first external electrode 30a to fourth external electrode 30d. A dimension T indicates the dimension in height direction x of three-terminal multilayer ceramic capacitor 100 including multilayer body 12 and first external electrode 30a to fourth external electrode 30d. A dimension W indicates the dimension in width direction y of three-terminal multilayer ceramic capacitor 100 including multilayer body 12 and first external electrode 30a to fourth external electrode 30d.

The dimensions of three-terminal multilayer ceramic capacitor 100 are not particularly limited, but are set, for example, such that dimension L in length direction z is about 1.0 mm or more and about 3.2 mm or less, dimension W in width direction y is about 0.5 mm or more and about 2.5 mm or less, and dimension T in height direction x is about 0.3 mm or more and about 2.5 mm or less. The dimensions of three-terminal multilayer ceramic capacitor 100 can be measured by a microscope.

2. Method of Manufacturing Three-Terminal Multilayer Ceramic Capacitor

The following describes one example of a method of manufacturing a three-terminal multilayer ceramic capacitor.

First, a dielectric sheet for a ceramic layer, a conductive paste for an internal electrode layer, and a conductive paste for an auxiliary electrode layer are prepared. Each of the dielectric sheet, the conductive paste for an internal electrode layer, and the conductive paste for an auxiliary electrode layer contains a binder and a solvent. In this case, a known binder and a known solvent may be used.

Then, the conductive paste for an internal electrode layer and the conductive paste for an auxiliary electrode layer are printed on the dielectric sheet in a prescribed pattern, for example, by screen printing or gravure printing. Thus, a dielectric sheet on which a pattern of the first internal electrode layer and a pattern of each of the third and fourth auxiliary electrode layers are formed is prepared, and a dielectric sheet on which a pattern of the second internal electrode layer and a pattern of each of the first and second auxiliary electrode layers are formed is prepared. More specifically, a screen mask for printing the first internal electrode layer and a screen mask for printing the second internal electrode layer are separately prepared, and the patterns of the respective internal electrode layers can be printed using a printing machine capable of separately printing these two types of screen masks.

Further, as to the dielectric sheet, when an auxiliary electrode layer is formed in the outer layer portion, a dielectric sheet for an outer layer is prepared in which a pattern of the auxiliary electrode layer is printed but a pattern of the internal electrode layer is not printed. Further, when no auxiliary electrode layer is formed in the outer layer portion, a dielectric sheet for an outer layer is prepared in which patterns of the internal electrode layer and the auxiliary electrode layer are not printed.

Then, a prescribed number of dielectric sheets for outer layers are stacked to form a portion to be provided as a second main surface-side outer layer portion on the second main surface side. Then, a dielectric sheet on which a pattern of the first internal electrode layer and patterns of the third and fourth auxiliary electrode layers are printed, and a dielectric sheet on which a pattern of the second internal electrode layer and patterns of the third and fourth auxiliary electrode layers are printed are sequentially stacked on a portion to be provided as the second main surface-side outer layer portion so as to form the structure of a preferred embodiment of the present invention. Thus, a portion to be provided as an inner layer portion is formed. Then, a prescribed number of dielectric sheets for an outer layer are stacked on this portion to be provided as an inner layer portion, to thus form a portion to be provided as the first main surface-side outer layer portion on the first main surface side. Thus, a multilayer sheet is produced.

Then, the multilayer sheet is pressed in the stacking direction by, for example, hydrostatic pressing to produce a multilayer block.

Then, the multilayer block is cut into a prescribed size to cut out multilayer chips. At this time, the corners and the ridges of each multilayer chip may be rounded by barrel polishing or the like.

Then, each cut-out multilayer chip is fired to produce a multilayer body. The firing temperature, which depends on the materials of the ceramic layer and the internal electrode layer, is preferably, for example, about 900° C. or higher and about 1400° C. or lower.

A plating treatment is performed in prescribed portions on first and second main surfaces 12a and 12b, first and second end surfaces 12e and 12f, first and second side surfaces 12c and 12d of multilayer body 12 to thus form first Cu plating layer 34a and second Cu plating layer 34b. Specifically, first Cu plating layer 34a is formed by a plating treatment on first internal electrode layer 16a exposed at first end surface 12e, first side surface 12c, and second side surface 12d, and first auxiliary electrode layer $29a_1$ exposed at first main surface 12a, second main surface 12b, first end surface 12e, first side surface 12c, and second side surface 12d. Further, second Cu plating layer 34b is formed on second internal electrode layer 16b exposed at second end surface 12f, first side surface 12c, and second side surface 12d, and second auxiliary electrode layer $29a_2$ exposed at first main surface 12a, second main surface 12b, second end surface 12f, first side surface 12c, and second side surface 12d.

Similarly, a plating treatment is performed in prescribed portions on first and second main surfaces 12a and 12b, and first and second side surfaces 12c and 12d of multilayer body 12 to thus form fifth Cu plating layer 34c and sixth Cu plating layer 34d. Specifically, fifth Cu plating layer 34c is formed by a plating treatment on second internal electrode layer 16b exposed at first side surface 12c, and third auxiliary electrode layer $29b_1$ exposed at first main surface 12a, second main surface 12b, and first side surface 12c. Also, sixth Cu plating layer 34d is formed by a plating treatment on second internal electrode layer 16b exposed at second side surface 12d, and fourth auxiliary electrode layer $29b_2$ exposed at first main surface 12a, second main surface 12b, and second side surface 12d.

In the plating treatment, for example, either electrolytic plating or electroless plating may be used. However, electroless plating requires a pretreatment with a catalyst or the like in order to improve the plating precipitation speed, which disadvantageously complicates the process. Thus, it is usually preferable to use electrolytic plating. As a plating method, for example, barrel plating is preferably used.

After first Cu plating layer 34a, second Cu plating layer 34b, fifth Cu plating layer 34c, and sixth Cu plating layer 34d are formed, multilayer body 12 is heat-treated at, for example, about 600° C. or higher and about 900° C. or lower. The heat treatment is performed in a nitrogen atmosphere for about 1 minute or longer and about 5 minutes or shorter in the state in which the actually measured peak temperature is maintained at, for example, about 700° C. or higher and about 800° C. or lower. In the present preferred embodiment, the heat treatment is performed using a continuous heat treatment furnace.

By performing the heat treatment, the average number of Cu particles can be about 1.5 or less, in first square regions 40a of first Cu plating layer 34a, in second square regions 40b of second Cu plating layer 34b, in fifth square regions 40c of fifth Cu plating layer 34c, and in sixth square regions 40d of sixth Cu plating layer 34d. In the heat treatment, the metal (for example, Cu or the like) in first and second Cu plating layers 34a and 34b and the metal (for example, Ni or the like) in first internal electrode layer 16a are mutually diffused, and also, the metal (for example, Cu or the like) in fifth and sixth Cu plating layers 34c and 34d and the metal (for example, Ni or the like) in second internal electrode layer 16b are mutually diffused. Thus, the adhesive strength between first Cu plating layer 34a and first internal electrode layer 16a can be improved, the adhesive strength between second Cu plating layer 34b and first internal electrode layer 16a can be improved, the adhesive strength between fifth Cu plating layer 34c and second internal electrode layer 16b can be improved, and the adhesive strength between sixth Cu plating layer 34d and second internal electrode layer 16b can be improved. Also, the ESR in the region including each of these adhesion portions can be reduced.

When the temperature in the heat treatment is lower than about 600° C., the adhesive strength between first and second Cu plating layers 34a and 34b and first internal electrode layer 16a becomes insufficient, and the adhesive strength between fifth and sixth Cu plating layers 34c and 34d and second internal electrode layer 16b becomes insufficient, and also, the ESR rises. When the temperature in the heat treatment is higher than about 900° C., diffusion of Cu atoms from first and second Cu plating layers 34a and 34b to first internal electrode layer 16a becomes excessive, and diffusion of Cu atoms from fifth and sixth Cu plating layers 34c and 34d to second internal electrode layer 16b becomes excessive. This produces voids in first Cu plating layer 34a, second Cu plating layer 34b, fifth Cu plating layer 34c, and sixth Cu plating layer 34d, and moisture enters the voids, so that the moisture resistance decreases.

Then, third Cu plating layer 35a and second Cu plating layer 35b are formed by a plating treatment on first Cu plating layer 34a and second Cu plating layer 34b, respectively. Similarly, seventh Cu plating layer 35c and eighth Cu plating layer 35d are formed by a plating treatment on fifth Cu plating layer 34c and sixth Cu plating layer 34d, respectively. The plating treatment performed in this case is the same as or similar to that in the case where first Cu plating layer 34a, second Cu plating layer 34b, fifth Cu plating layer 34c, and sixth Cu plating layer 34d are formed. However, no heat treatment is performed after the plating treatment.

Further, by the same plating treatment as described above, first outer plating layer 36a is formed so as to cover first Cu plating layer 34a and third Cu plating layer 35a while second outer plating layer 36b is formed so as to cover second Cu plating layer 34b and fourth Cu plating layer 35b. Further, by the same plating treatment as described above, third outer plating layer 36c is formed so as to cover fifth Cu plating layer 34c and seventh Cu plating layer 35c while fourth outer plating layer 36d is formed so as to cover sixth Cu plating layer 34d and eighth Cu plating layer 35d. In the present preferred embodiment, first outer plating layer 36a, second outer plating layer 36b, third outer plating layer 36c, and fourth outer plating layer 36d each are formed by sequentially stacking the lower plating layer plated with Ni and the upper plating layer plated with Sn.

As described above, three-terminal multilayer ceramic capacitor 100 according to the present preferred embodiment is manufactured.

In the present preferred embodiment, first auxiliary electrode layer $29a_1$ may not be provided as long as first extending electrode portion $28a_1$ exposed at least at first end surface 12e can ensure the adhesive strength between first Cu plating layer 34a and first internal electrode layer 16a. Similarly, second auxiliary electrode layer $29a_2$ may not be provided as long as second extending electrode portion 28a₂ exposed at least at second end surface 12f can ensure the adhesive strength between second Cu plating layer 34b and first internal electrode layer 16a. Similarly, third auxiliary electrode layer 29b₁ may not be provided as long as third extending electrode portion 28b₁ exposed at least at first side surface 12c can ensure the adhesive strength between fifth Cu plating layer 34c and second internal electrode layer 16b. Similarly, fourth auxiliary electrode layer 29b₂ may not be provided as long as fourth extending electrode portion 28b₂ exposed at least at second side surface 12d can ensure the adhesive strength between sixth Cu plating layer 34d and second internal electrode layer 16b.

Although preferred embodiments of the present invention have been described above, the present invention is not limited thereto.

In other words, various modifications can be made to the above-described preferred embodiments with regard to mechanisms, shapes, materials, number and quantities, positions, arrangements, or the like without departing from the scope of the technical idea and the present invention, and these modifications are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer body including a plurality of ceramic layers that are stacked, the multilayer body including:
      a first main surface and a second main surface opposite to each other in a height direction;
      a first end surface and a second end surface opposite to each other in a length direction orthogonal or substantially orthogonal to the height direction; and
      a first side surface and a second side surface opposite to each other in a width direction orthogonal or substantially orthogonal to the height direction and the length direction;
   a plurality of first internal electrode layers provided on the ceramic layers and extending to the first end surface;
   a plurality of second internal electrode layers provided on the ceramic layers and extending to the second end surface;
   a first external electrode provided on the first end surface and connected to the first internal electrode layers; and
   a second external electrode provided on the second end surface and connected to the second internal electrode layers; wherein
   the first external electrode includes a first Cu plating layer and a third Cu plating layer on the first Cu plating layer;
   the second external electrode includes a second Cu plating layer and a fourth Cu plating layer on the second Cu plating layer;
   an average number of Cu particles is about 1.5 or less in any two or more first square regions of the first Cu plating layer on a side of the first end surface;
   an average number of Cu particles is about 1.5 or less in any two or more second square regions of the second Cu plating layer on a side of the second end surface;
   an average number of Cu particles is more than about 1.5 in any two or more third square regions of the third Cu plating layer on a side of the first end surface;
   an average number of Cu particles is more than about 1.5 in any two or more fourth square regions of the fourth Cu plating layer on a side of the second end surface; and
   each of the first square regions to the fourth square regions has a square or substantially square shape with each side having a length of about 2 μm.

2. The multilayer ceramic electronic component according to claim 1, wherein a Cu content in each of the third Cu plating layer and the fourth Cu plating layer is about 95% or more.

3. The multilayer ceramic electronic component according to claim 1, wherein a Cu content in each of the first Cu plating layer and the second Cu plating layer is about 60% or more.

4. The multilayer ceramic electronic component according to claim 1, wherein
   the first Cu plating layer includes a first Ni diffusion region in which Ni is diffused, the first Ni diffusion region being adjacent to the first end surface, and the first Ni diffusion region has a length of about ⅖ or less of a first length that is equal or substantially equal to a thickness of the first Cu plating layer from the first end surface in the length direction; and
   the second Cu plating layer includes a second Ni diffusion region in which Ni is diffused, the second Ni diffusion region being adjacent to the second end surface, and the second Ni diffusion region has a length of about ⅖ or less of a second length that is equal or substantially equal to a thickness of the second Cu plating layer from the second end surface in the length direction.

5. The multilayer ceramic electronic component according to claim 1, wherein
   the first external electrode includes a first outer plating layer on the third Cu plating layer; and
   the second external electrode includes a second outer plating layer on the fourth Cu plating layer.

6. The multilayer ceramic electronic component according to claim 5, wherein each of the first and second outer plating layers includes at least one of Cu, Ni, Sn, Ag, Pd, an Ag—Pd alloy, or Au.

7. The multilayer ceramic electronic component according to claim 5, wherein each of the outer plating layers includes a lower plating layer and an upper plating layer.

8. The multilayer ceramic electronic component according to claim 7, wherein
   the lower plating layer includes Ni; and
   the upper plating layer includes Sn.

9. A multilayer ceramic electronic component comprising:
   a multilayer body including a plurality of ceramic layers that are stacked, the multilayer body including:
      a first main surface and a second main surface opposite to each other in a height direction;
      a first end surface and a second end surface opposite to each other in a length direction orthogonal or substantially orthogonal to the height direction; and
      a first side surface and a second side surface opposite to each other in a width direction orthogonal or substantially orthogonal to the height direction and the length direction;
   a plurality of first internal electrode layers provided on the ceramic layers and extending to the first end surface and the second end surface;
   a plurality of second internal electrode layers provided on the ceramic layers and extending to the first side surface and the second side surface;

a first external electrode provided on the first end surface and connected to the first internal electrode layers;

a second external electrode provided on the second end surface and connected to the first internal electrode layers;

a third external electrode on the first side surface and extending from the first side surface onto a portion of the first main surface and a portion of the second main surface, the third external electrode being connected to the second internal electrode layers; and a fourth external electrode on the second side surface and extending from the second side surface onto a portion of the first main surface and a portion of the second main surface, the fourth external electrode being connected to the second internal electrode layers; wherein the first external electrode includes a first Cu plating layer and a third Cu plating layer on the first Cu plating layer;

the second external electrode includes a second Cu plating layer and a fourth Cu plating layer on the second Cu plating layer;

an average number of Cu particles is about 1.5 or less in any two or more first square regions of the first Cu plating layer on a side of the first end surface;

an average number of Cu particles is about 1.5 or less in any two or more second square regions of the second Cu plating layer on a side of the second end surface;

an average number of Cu particles is more than about 1.5 in any two or more third square regions of the third Cu plating layer on a side of the first end surface;

an average number of Cu particles is more than about 1.5 in any two or more fourth square regions of the fourth Cu plating layer on a side of the second end surface;

the third external electrode includes a fifth Cu plating layer and a seventh Cu plating layer on the fifth Cu plating layer;

the fourth external electrode includes a sixth Cu plating layer and an eighth Cu plating layer on the sixth Cu plating layer;

an average number of Cu particles is about 1.5 or less in any two or more fifth square regions of the fifth Cu plating layer on a side of the first end surface;

an average number of Cu particles is about 1.5 or less in any two or more sixth square regions of the sixth Cu plating layer on a side of the second end surface;

an average number of Cu particles is more than about 1.5 in any two or more seventh square regions of the seventh Cu plating layer on a side of the first end surface;

an average number of Cu particles is more than about 1.5 in any two or more eighth square regions of the eighth Cu plating layer on a side of the second end surface; and each of the first square regions to the eighth square regions has a square or substantially square shape with each side having a length of about 2 μm.

10. The multilayer ceramic electronic component according to claim 9, wherein a Cu content in each of the third Cu plating layer and the fourth Cu plating layer is about 95% or more.

11. The multilayer ceramic electronic component according to claim 9, wherein a Cu content in each of the first Cu plating layer and the second Cu plating layer is about 60% or more.

12. The multilayer ceramic electronic component according to claim 9, wherein the first Cu plating layer includes a first Ni diffusion region in which Ni is diffused, the first Ni diffusion region being adjacent to the first end surface, and the first Ni diffusion region has a length of about ⅖ or less of a first length that is equal or substantially equal to a thickness of the first Cu plating layer from the first end surface in the length direction; and the second Cu plating layer includes a second Ni diffusion region in which Ni is diffused, the second Ni diffusion region being adjacent to the second end surface, and the second Ni diffusion region has a length of about ⅖ or less of a second length that is equal or substantially equal to a thickness of the second Cu plating layer from the second end surface in the length direction.

13. The multilayer ceramic electronic component according to claim 9, wherein a Cu content in each of the seventh Cu plating layer and the eighth Cu plating layer is about 95% or more.

14. The multilayer ceramic electronic component according to claim 9, wherein a Cu content in each of the fifth Cu plating layer and the sixth Cu plating layer is about 60% or more.

15. The multilayer ceramic electronic component according to claim 9, wherein the fifth Cu plating layer includes a fifth Ni diffusion region in which Ni is diffused, the fifth Ni diffusion region being adjacent to the first side surface, and the fifth Ni diffusion region has a length of about ⅖ or less of a fifth length that is equal or substantially equal to a thickness of the fifth Cu plating layer from the first side surface in the width direction; and the sixth Cu plating layer includes a sixth Ni diffusion region in which Ni is diffused, the sixth Ni diffusion region being adjacent to the second side surface, and the sixth Ni diffusion region has a length of about ⅖ or less of a sixth length that is equal or substantially equal to a thickness of the sixth Cu plating layer from the second side surface in the width direction.

16. The multilayer ceramic electronic component according to claim 9, wherein the first external electrode includes a first outer plating layer on the third Cu plating layer; and the second external electrode includes a second outer plating layer on the fourth Cu plating layer.

17. The multilayer ceramic electronic component according to claim 16, wherein each of the first and second outer plating layers includes at least one of Cu, Ni, Sn, Ag, Pd, an Ag—Pd alloy, or Au.

18. The multilayer ceramic electronic component according to claim 16, wherein each of the outer plating layers includes a lower plating layer and an upper plating layer.

19. The multilayer ceramic electronic component according to claim 18, wherein the lower plating layer includes Ni; and the upper plating layer includes Sn.

* * * * *